(12) United States Patent
Ji et al.

(10) Patent No.: US 8,724,562 B2
(45) Date of Patent: May 13, 2014

(54) METHOD AND APPARATUS FOR TRANSMITTING/RECEIVING CONTROL CHANNEL

(75) Inventors: Hyoung Ju Ji, Seoul (KR); Joon Young Cho, Gyeonggi-do (KR); Jin Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 317 days.

(21) Appl. No.: 12/857,139

(22) Filed: Aug. 16, 2010

(65) Prior Publication Data

US 2011/0038303 A1    Feb. 17, 2011

(30) Foreign Application Priority Data

| Aug. 14, 2009 | (KR) | 10-2009-0075065 |
| Oct. 5, 2009 | (KR) | 10-2009-0094295 |
| Feb. 11, 2010 | (KR) | 10-2010-0012681 |
| May 4, 2010 | (KR) | 10-2010-0042158 |

(51) Int. Cl.
*H04W 4/00* (2009.01)
*H04W 74/00* (2009.01)

(52) U.S. Cl.
CPC ................................. *H04W 74/002* (2013.01)
USPC ......................................... 370/329; 370/474

(58) Field of Classification Search
USPC ......... 370/203–210, 315, 328, 330, 334–349, 370/465, 474; 375/260–265
See application file for complete search history.

(56) References Cited

U.S. PATENT DOCUMENTS

| 2005/0153726 | A1* | 7/2005 | Takano ....................... 455/522 |
| 2008/0232495 | A1 | 9/2008 | Yu et al. |
| 2009/0003486 | A1 | 1/2009 | Kwon et al. |
| 2009/0097447 | A1* | 4/2009 | Han et al. ..................... 370/330 |
| 2009/0116573 | A1* | 5/2009 | Gaal et al. ..................... 375/267 |
| 2009/0296629 | A1* | 12/2009 | Lincoln et al. ................ 370/321 |
| 2010/0232379 | A1* | 9/2010 | Molnar et al. ................ 370/329 |
| 2010/0246455 | A1* | 9/2010 | Nangia et al. ................ 370/280 |
| 2011/0164550 | A1* | 7/2011 | Chen et al. .................... 370/315 |

FOREIGN PATENT DOCUMENTS

WO    WO 2008/133415    11/2008

* cited by examiner

*Primary Examiner* — Kan Yuen

(74) *Attorney, Agent, or Firm* — The Farrell Law Firm, P.C.

(57) ABSTRACT

A method and apparatus for transmitting/receiving control channels through a wireless backhaul in an OFDM-based communication system including relay nodes is provided. A method for transmitting a control channel includes arranging control resources for at least one receiver; sorting the control resources and null resources in a control channel region; rearranging the control resources to be distributed and the null resources to be adjacent to the distributed control resources; and mapping the control resources and null resources to the control channel region.

15 Claims, 16 Drawing Sheets

FIG. 11
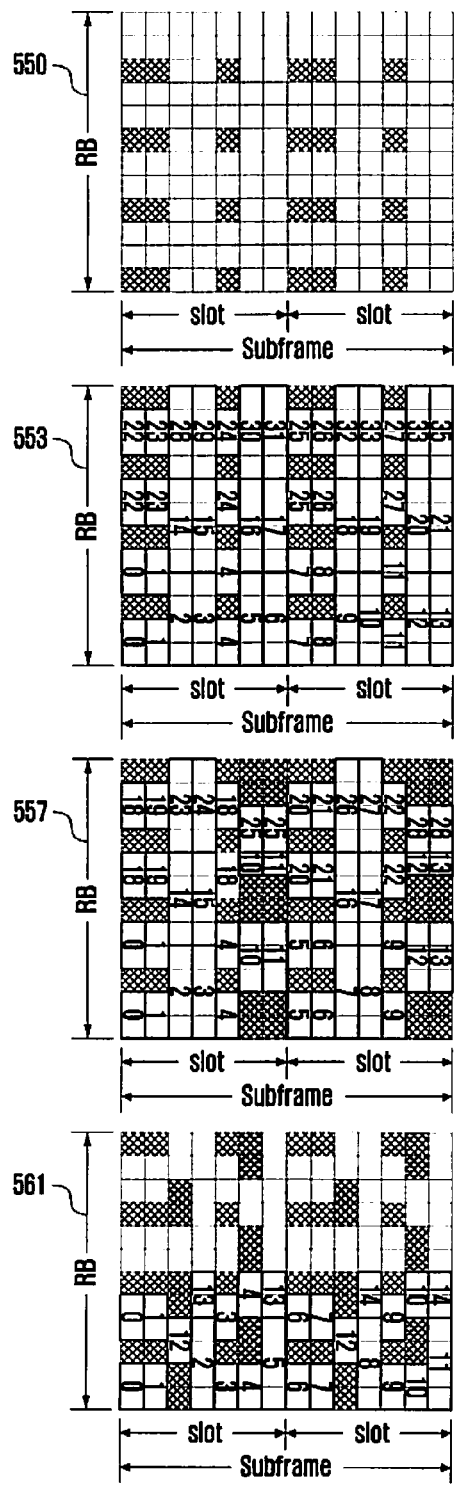
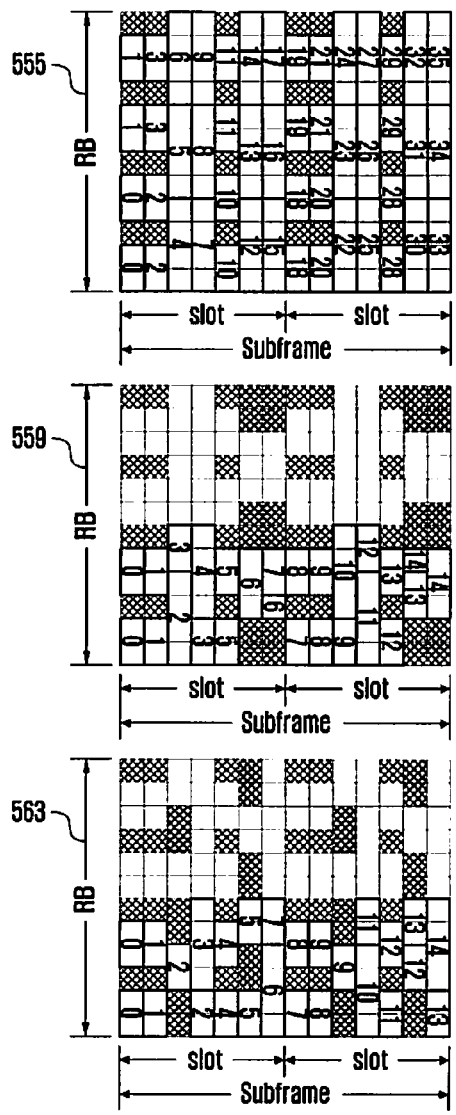

METHOD AND APPARATUS FOR TRANSMITTING/RECEIVING CONTROL CHANNEL

PRIORITY

This application claims priority to Korean Patent Application Nos. 10-2009-0075065, filed on Aug. 14, 2009, 10-2009-0094295, filed on Oct. 5, 2009, 10-2010-0012681, filed on Feb. 11, 2010, 10-2010-0042158, filed on May 4, 2010 in the Korean Intellectual Property Office, the disclosure of each of which is incorporated herein in its entirety by reference.

BACKGROUND OF THE INVENTION

1. Field of the Invention

The present invention relates to wireless communications and, in particular, to a method and apparatus for transmitting/receiving control channels through a wireless backhaul in an OFDM-based communication system including relay nodes.

2. Description of the Related Art

Orthogonal Frequency Division Multiplexing (OFDM) is a multicarrier modulation technique in which a serial input symbol stream is converted into parallel symbol streams and modulated into mutually orthogonal subcarriers, i.e., a plurality of subcarrier channels.

The multicarrier modulation-based system was first applied to military high-frequency radios in the late 1950s, and the OFDM scheme, which overlaps multiple orthogonal subcarriers, has been developing since the 1970s. There were limitations on its application to actual systems due to the difficulty in realization of orthogonal modulation between multiple carriers. However, the OFDM scheme has undergone rapid development since Weinstein et al. presented in 1971 that OFDM-based modulation/demodulation can be efficiently processed using DFT (Discrete Fourier Transform). In addition, as a scheme that is known as one that uses a guard interval and inserts a Cyclic Prefix (CP) symbol into the guard interval, the negative influence of the system on the multiple paths and delay spread has been reduced significantly.

Owing to such technical developments, OFDM technology is being widely applied to digital transmission technologies such as Digital Audio Broadcasting (DAB), Digital Video Broadcasting (DVB), Wireless Local Area Network (WLAN), Wireless Asynchronous Transfer Mode (WATM), etc. That is, the OFDM scheme could not be widely used before due to its high hardware complexity, but the development of various digital signal processing technologies including Fast Fourier Transform (FFT) and Inverse Fast Fourier Transform (IFFT) has enabled its realization.

OFDM, though it is similar to the conventional Frequency Division Multiplexing (FDM), can obtain optimal transmission efficiency during high-speed data transmission by maintaining orthogonality between multiple tones. In addition, the OFDM scheme can obtain optimal transmission efficiency during high-speed data transmission as it has high frequency utilization efficiency and is robust against multipath fading.

Since OFDM overlaps the frequency spectra of the subcarriers, it has high frequency utilization efficiency, is robust against frequency selective fading, can reduce an Inter-Symbol Interference (ISI) effect with the use of a guard interval, can facilitate design of the simple hardware of an equalizer, and is robust against impulse noises. Therefore, the OFDM scheme is used for various communication systems.

In wireless communications, high-speed, high-quality data services are generally hindered by channel environment. In wireless communications, channel environments suffer from frequent changes not only due to Additive White Gaussian Noise (AWGN) but also power variation of received signals, caused by a fading phenomenon, shadowing, a Doppler effect due to movement of a terminal and a frequent change in a velocity of the terminal, interference by other users or multipath signals, etc. Therefore, in order to support high-speed, high-quality data services in wireless communication, there is a need to efficiently overcome the above factors.

In OFDM, modulation signals are located in the two-dimensional time-frequency resources. Resources on the time domain are divided into different OFDM symbols, and are orthogonal with each other. Resources on the frequency domain are divided into different tones, and are also orthogonal with each other. That is, the OFDM scheme defines one minimum unit resource by designating a particular OFDM symbol on the time domain and a particular tone on the frequency domain, and the unit resource is called a Resource Element (RE). Since different REs are orthogonal with each other, signals transmitted on different REs can be received without causing interference to each other.

A physical channel is a channel defined on the physical layer for transmitting modulation symbols obtained by modulating one or more coded bit sequences. In an Orthogonal Frequency Division Multiple Access (OFDMA) system, a plurality of physical channels can be transmitted depending on the usage of an information sequence or receiver. The transmitter and receiver negotiate the RE on which a physical channel is transmitted, and this process is called mapping.

SUMMARY OF THE INVENTION

It is an objective of the present invention to provide a method and apparatus for transmitting/receiving control channels on a backhaul link that is capable of efficiently multiplexing the control channel with the data into the backhaul subframe regardless of an amount of time-varying control channel information, resulting in reduction of resource waste.

In accordance with an aspect of the present invention, a method for transmitting control channels includes arranging control resources for at least one receiver; sorting the control resources and null resources in a control channel region; rearranging the control resources to be distributed and the null resources to be adjacent to the distributed control resources; and mapping the control resources and null resources to the control channel region.

In accordance with another aspect of the present invention, an apparatus for transmitting control channels includes a control channel configuration unit which arranges control resources for at least one receiver; a multiplexer which multiplexes the control resources and remaining null resources into a control channel region; a resource arrangement unit which distributes the control resources and places the null resources adjacent to the distributed control resources; and a mapper which maps the control resources and null resources to the control channel region.

In accordance with another aspect of the present invention, a method for receiving control channels includes arranging channel resources in a predetermined control channel region; sorting the channel resources into control resources for control signals and null resources adjacent to the control resources; and receiving a control signal in at least some of the control resources.

In accordance with still another aspect of the present invention, an apparatus for receiving control channels includes a demapper which arranges channel resources in a predetermined control channel region; a resource arrangement unit which sorts the channel resources into control resources for control signals and null resources adjacent to the control resources; and a decoder which decodes a control signal in at least some of the control resources.

BRIEF DESCRIPTION OF THE DRAWINGS

The above and other objects, features and advantages of the present invention will be more apparent from the following detailed description in conjunction with the accompanying drawings, in which:

FIG. 11 is a diagram illustrating R-CCE structures that are available in the embodiments of the present invention;

DETAILED DESCRIPTION OF EMBODIMENTS OF THE PRESENT INVENTION

Figure 1:
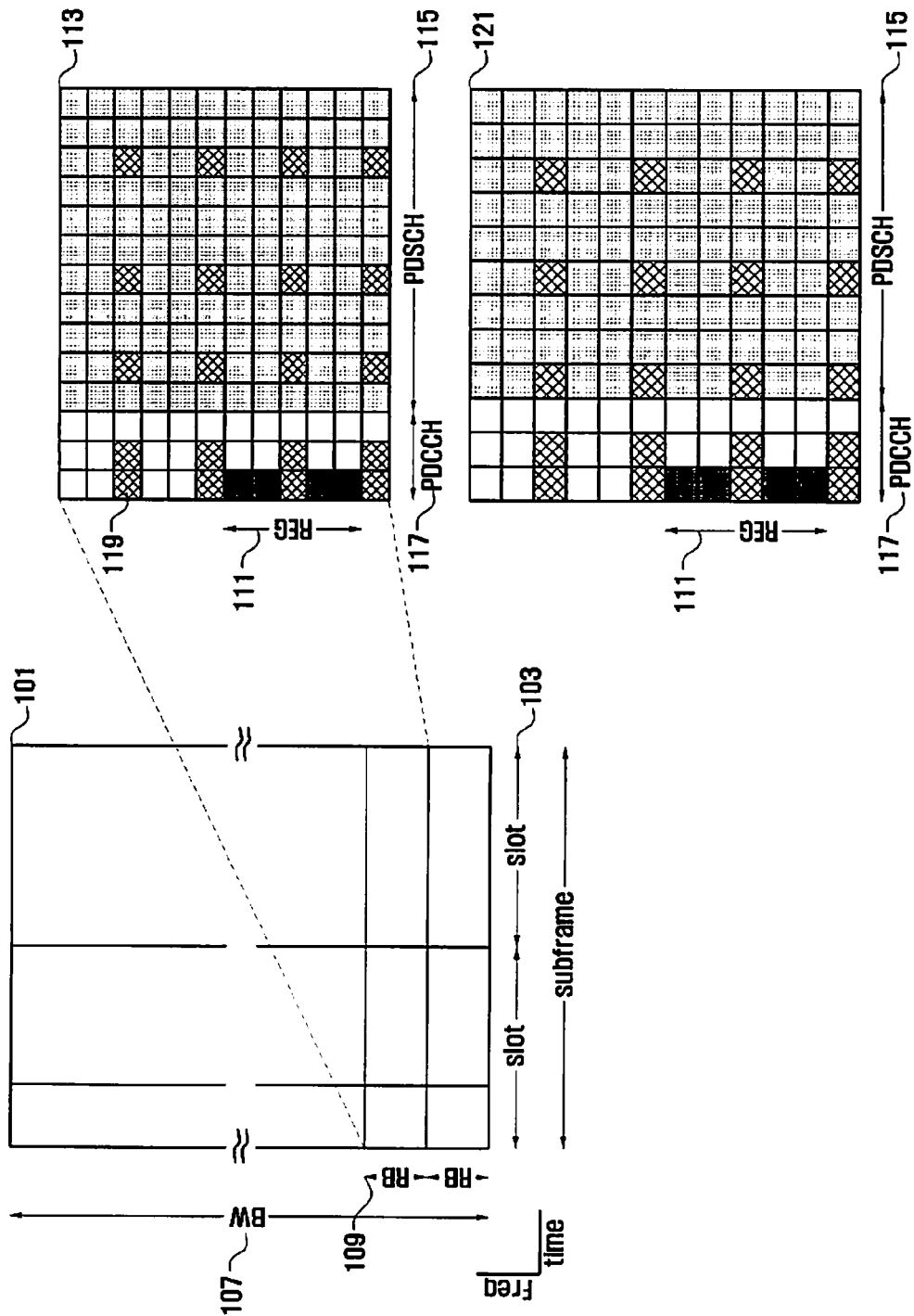
FIG. 1 is a diagram illustrating a structure of the subframe of a Long Term Evolution (LTE) system to which the present invention is applied.

Embodiments of the present invention are described with reference to the accompanying drawings in detail. The same reference numbers are used throughout the drawings to refer to the same or like parts. A detailed description of well-known functions and structures incorporated herein may be omitted to avoid obscuring the subject matter of the present invention.

Terms and words used in the specification and claims are to be regarded as concepts to illustrate the best method of the present invention, and are to be interpreted as having meanings and concepts adapted to the scope and sprit of the present invention to understand the technology of the present invention. Therefore, the embodiments described in the specification and the constructions illustrated in the drawings correspond to only the most preferable embodiments, but do not represent all of the technical spirit of the present invention. Accordingly, it should be understood that various equivalents and modifications can be substituted at the time of filling the present invention.

Although the descriptions is directed to Long Term Evolution (LTE) and LTE-Advanced (LTE-A) systems, the present invention can be applied to other wireless communication systems using base station scheduling.

LTE uses OFDM in the downlink direction and Single Carrier-Frequency Division Multiple Access (SC-FDMA) in the uplink direction. LTE-A is an evolution of LTE to support wider bandwidth by aggregating two or more LTE component carriers. FIG. 1 is a diagram illustrating a structure of the subframe of an LTE system to which the present invention is applied.

Referring to FIG. 1, a subframe 101 is defined by a time interval of 1 ms and LTE frequency bandwidth 107. The subframe 101 consists of two consecutive timeslots 103. The LTE bandwidth 107 is composed of a plurality of Resource Blocks (RBs) 109, 113, and 121, and each RB is a basic unit of resource allocation. An RB is defined as 12 tones in the frequency domain and 14 OFDM symbols in the time domain. The subframe structured as above is called a Normal Cyclic Prefix (CP) subframe. In the case that an RB 121 is defined as 12 tones in the frequency domain and 12 OFDM symbols in the time domain, the subframe is called an Extended CP subframe. The subframe 101 includes a control channel region 117 for transmitting control channels and a data channel region 115 for transmitting data channels, and Reference Signals (RS) 119 are inserted into the control channel region 117 and the data channel region 115 for channel estimation.

The reference signals 119 are signals negotiated between the mobile terminal and the base station for the mobile terminal to estimate the channel. The reference signals 119 can carry information on the number of antenna ports, e.g., 0, 1, 2, and 3. In the case that the number of antenna ports is greater than 1, this means that multiple antennas are used. Although the absolute position of the RE for the RS 119 in the frequency domain varies depending on the cell, the interval between the RSs 119 is maintained regularly. That is, the RS 119 of the same antenna port maintains a distance of 6 REs, and the reason why the absolute position of the RS 119 varies is to avoid collision of the RSs of different cells.

The control channel region 117 is arranged at the front end of the subframe 101. That is, the control channel region 117 occupies the L OFDM symbols at the front end of the subframe 101. L can have a value of 1, 2, or 3. For example, in the case that the control information is small in amount so as to be carried by a single OFDM symbol, the first OFDM symbol is assigned for the control channel region 117 (L=1), and the remaining 13 OFDM symbols are assigned for the data channel region 115. The value L is used as the basic information for demapping in the control channel reception process. If the value L is not received, it is impossible to recover the control channel. In the case that the subframe 101 is for a Multimedia Broadcast over a Single Frequency Network (MBSFN), L is set to 2. The MBSFN is a channel for transmitting broadcast information. In this case, the terminal can receive the control channel region 117 but not the data channel region 115.

The control channel region 117 is placed at the front end of the subframe 101 such that the terminal can determine whether to perform data channel reception depending on whether there is a data channel destined to the terminal based on the information carried on the control channel region 117. If there is no data channel destined to the terminal, the terminal does not perform operations related to data reception, resulting in avoidance of unnecessary power waste.

In LTE, three down link control channels, i.e. Physical Control Format Indicator CHannel (PCFICH), Physical Hybrid ARQ Indicator CHannel (PHICH), and Packet Data Control CHannel (PDCCH), are defined and transmits in units of Resource Element Groups (REGs) 111.

The PCFICH is a physical channel for transmitting Control Channel Format Indicator (CCFI) information. CCFI is the 2-bit information indicating the number of symbols (L) assigned for the control channel regions 117. Since the terminal can know the number of symbols assigned for the control channel region 117 based on the CCFI, all of the terminals must receive the PCFICH in the subframe except when the downlink resource is fixedly allocated in the control channel region 117. Since the terminal does not know L before receipt of the PCFICH, the PCFICH must be transmitted at the first OFDM symbol in the control channel region 117. The PCFICH is divided into 4 parts for 16 subcarriers and transmitted across the entire bandwidth.

The PHICH is a physical channel for transmitting a downlink ACK/NACK signal. The PHICH is received by the terminal which is transmitting data in the uplink. Accordingly, the number of PHICHs is in proportion to the number of terminals that are transmitting in the uplink. The PHICH can be transmitted in the first OFDM symbol ($L_{PHICH}=1$) or across three OFDM symbols ($L_{PHICH}=3$). The information on the PHICH (number of symbols, $L_{PHICH}$) is transmitted from the base station to the terminals within the cell at the initial access. Like the PCFICH, the PHICH is transmitted in a position designated per cell. Accordingly, the PHICH can be received after receipt of Primary Broadcast Channel (PBCH) information regardless of other control channels.

The PDCCH is a physical channel for transmitting data channel allocation information and/or power control information. The PDCCH can be configured with a different channel coding rate according to the channel condition of the mobile terminal. Since the base station uses Quadrature Phase Shift Keying (QPSK) as a fixed modulation scheme of the PDCCH, it is required to change the amount of resources allocated for the PDCCH in order to change the channel coding rate. That is, the base station uses a high channel coding rate for the mobile terminal of which channel conditions are good so as to reduce the amount of resources for data transmission. In contrast, the base station uses a low channel coding rate for the mobile terminal of which channel conditions are bad in order to increase the reception probability of the mobile terminal even at the cost of large amounts of resources. The resource amount assigned for each PDCCH is determined in units of Control Channel Element (CCE). A CCE consists of a plurality of REGs 111. The REG 111 of the PDCCH is placed in the control channel region 117 after being interleaved to obtain diversity.

In order to multiplex several ACK/NACK signals, the Code Domain Multiplexing (CDM) technique is applied for the PHICH. In a single REG 111, 8 PHICH signals are multiplexed into 4 real number parts and 4 imaginary number parts by means of the CDM technique and repeated as many as $N_{PHICH}$ so as to be distributed in the frequency domain to obtain frequency diversity gain. By using $N_{PHICH}$ REGs 111, it is possible to form the 8 or less PHICH signals. In order to form more than 8 PHICH signals, it is necessary to use other $N_{PHICH}$ REGs 111.

After assigning the PCFICH and PHICH, a scheduler determines the value of L, maps the physical channels to the REG 111 of the assigned control channel region 117 based on the value of L, and performs interleaving to obtain frequency diversity gain. The interleaving is performed on the total REGs 111 of the subframe 101 determined by the value of L in units of REG in the control channel region 117. The output of the interleaver in the control channel region 117 is capable of preventing Inter-Cell Interference (ICI) caused by using the same interleaver for the cells and obtaining the diversity gain by distributing the REGs 111 of the control channel region 117 across one or more symbols. Also, it is guaranteed that the REGs 111 forming the same control channel are distributed uniformly across the symbols per control channel.

Figure 2:
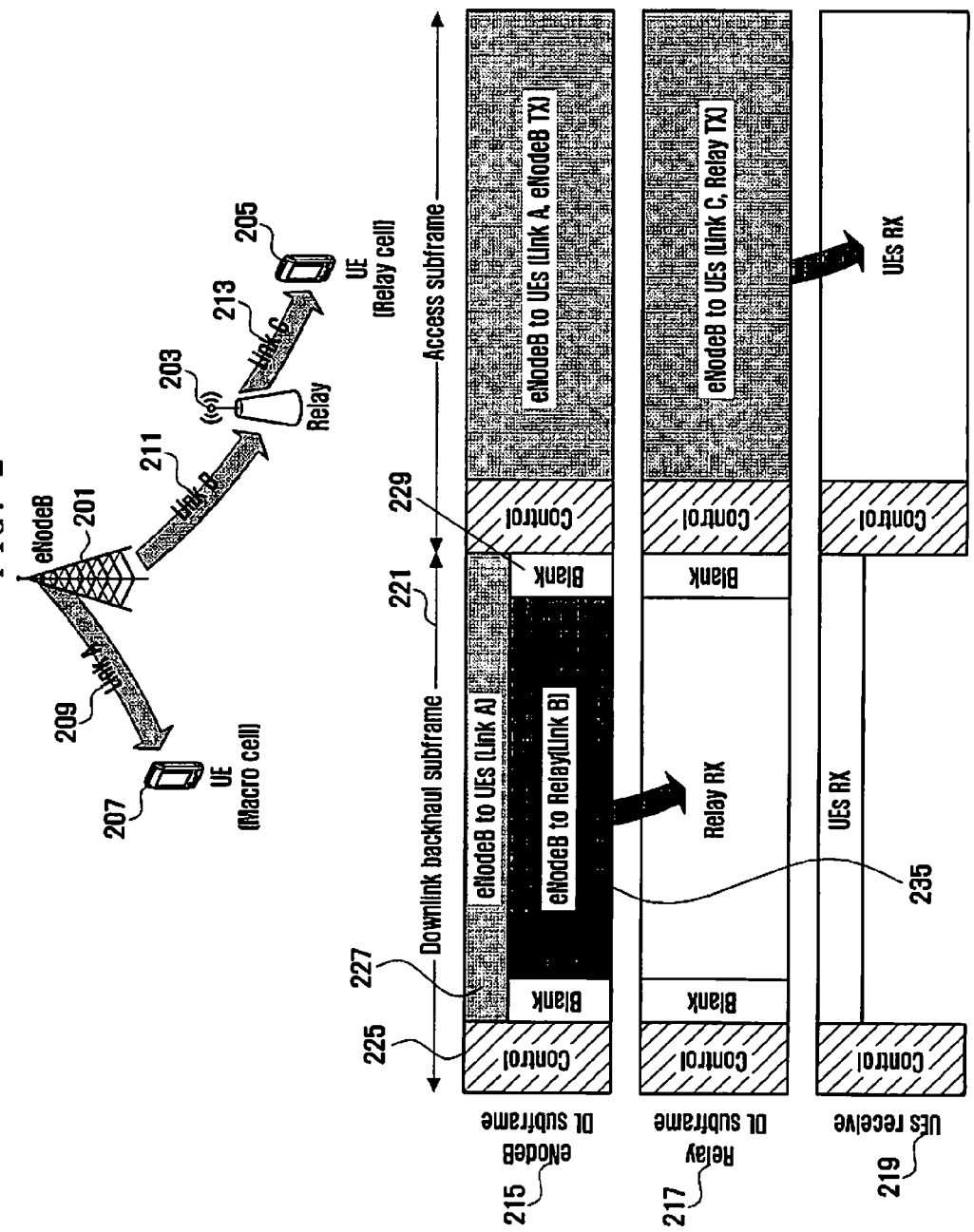
FIG. 2 is a diagram illustrating an operating principle of a relay in an LTE-A system according to an embodiment of the present invention.

Recently, research is being conducted on LTE-A as an advanced LTE system. Particularly, much of the research is focused on the extension of coverage with relays which remove shadow areas in the cell and wireless backhaul for connecting base stations with relays which operate in the same manner as the base station. FIG. 2 is a diagram illustrating an operating principle of a relay in an LTE-A system according to an embodiment of the present invention.

Referring to FIG. 2, the base station 201 can send the data to the mobile terminal 207 directly or to the mobile terminal 205 via a relay 203. The relay 203 receives the data destined to the mobile terminal 205 and delivers the data to the mobile terminal 205. That is, the base station 201 and the mobile terminal 207 are connected through a link A 209, and the base station 201 and the relay 203 are connected through a link B 211, and the relay 203 and the mobile terminal 205 are connected through a link C 213. The relay 203 can send data to the mobile terminal 205 through the link C 213 and exchange higher layer signal with the base station 201 through the link B 211.

In such a configuration, different structures of subframes are used between the base station 201 and relay 203, between the relay 203 and mobile terminal 205, and between the base station 201 and the mobile terminal 207. The base station 201 transmits data to the mobile terminal 207 or the relay 203 using a subframe structured as denoted by reference number 215. The relay 203 receives/transmits data from/to the base station 201 using the subframe structured as denoted by reference number 217. The mobile terminals 205 and 207 receive the data from the base station 201 or the relay 203 using the subframe structured as denoted by reference number 219. Here, the mobile terminal 205 can regard the relay 203 and the base station 201 as the same node and, in this case, there is no need to distinguish between the data transmitted by the base station 201 and the relay 203. The different types of subframes 215, 217, and 219 can be used as the backhaul subframe 221 for backhaul transmission.

The backhaul subframe 221 can be multiplexed for the mobile terminals 205 and 207 connected to the base station 201 and can be dedicated for backhaul transmission. In the control channel region 225 of the backhaul subframe, the base station 201 and the relay 203 transmit control channels. The relay 203 cannot receive data while transmitting data. Accordingly, when the relay 203 transmits the control channel, it cannot receive the control channel signal transmitted by the base station 201. The base station 201 transmits a data channel in the data channel regions 227 and 235 after the transmission of the control channel such that the relay 203 should receive the corresponding data region. The relay 203 receives the data channel in the data channel regions 227 and 235. After the transmission in the data channel regions 227 and 235, the relay 203 is required to switch from transmission to reception. Accordingly, there is a need of a blank region 229 following the data channel regions 227 and 235.

Figure 3:
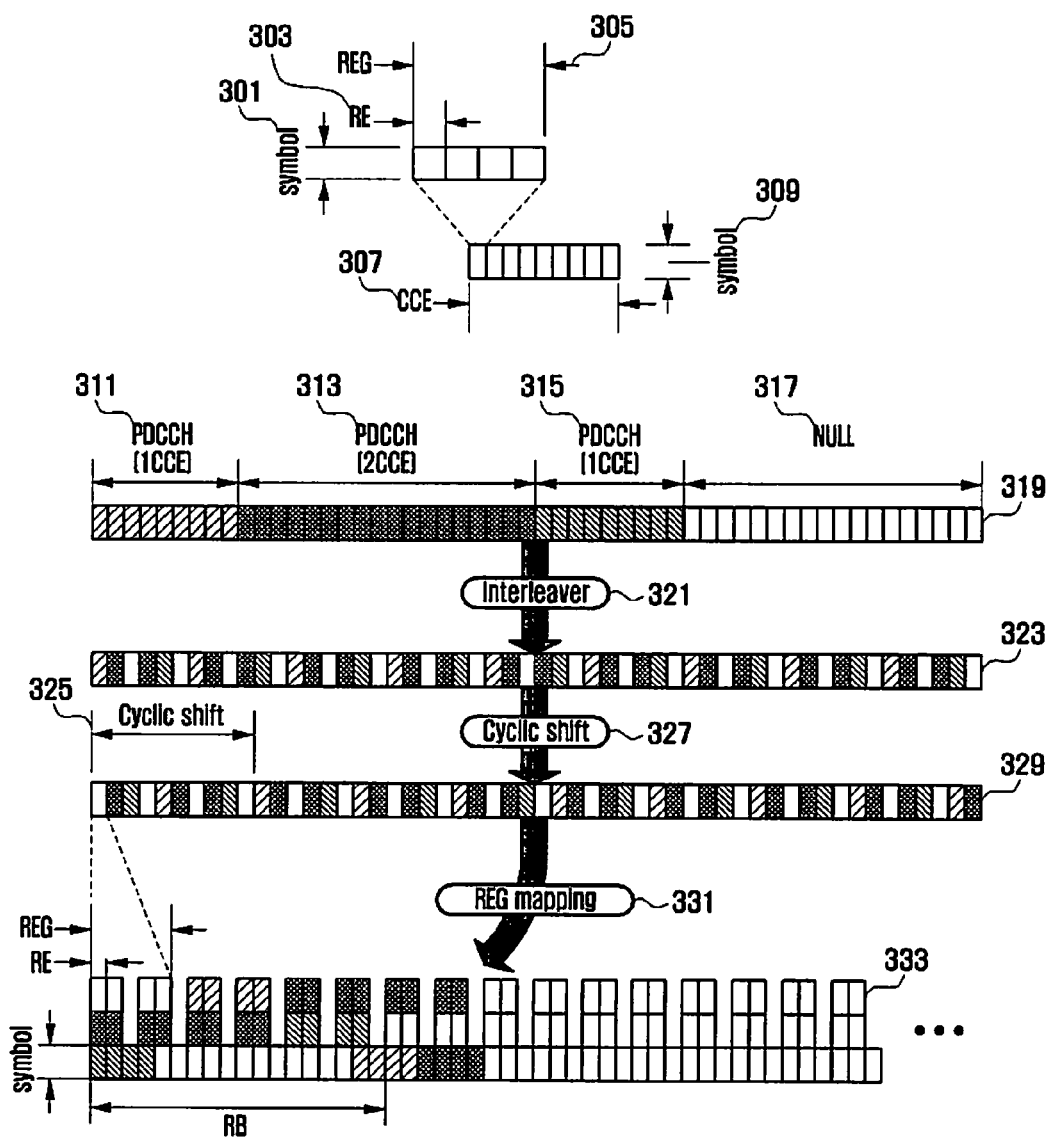
FIG. 3 is a diagram illustrating a structure of a control channel region of the subframe in the LTE system to which the present invention is applied.

FIG. 3 is a diagram illustrating a structure of a control channel region of the subframe in the LTE system to which the present invention is applied.

In FIG. 3, REG 305 denotes a basic unit of resource assigned for the control channel in the LTE system. The REG 305 consists of 4 consecutive REs 303 exclusive of the RSs in the frequency domain. The REG 305 can be used as a unit for assigning resources and multiplexing each control channel. Multiple REGs 305 constitute a CCE 307. For example, the CCE 307 is composed of 9 REGs 305. A CCE is a basic unit for transmitting a PDCCH carrying the scheduling information. The PDCCHs 311, 313, and 315 can be transmitted on at least one CCE 307, and this is called aggregation. When the PDCCHs 311, 313, and 315 are aggregated in a single CCE, it is expressed that the PDCCHs are aggregated at aggregation level 1. Also, the aggregation of the PDCCHs in 8 CCEs is expressed in such a manner that the PDCCHs are aggregated at aggregation level 8. In the LTE system, the PDCCHs 311, 313, and 315 can be aggregated at one of the 1, 2, 4, and 8 aggregation levels.

In order to secure the control channel region 333, the base station determines the aggregation levels of individual PDCCHs 311, 313, and 315 according to the corresponding mobile terminals and generates a first control channel series 319 composed of the PDCCHs 311, 313, and 315. Since the total amount of resources for the PDCCH 311, 313, and 315 are determined by the value L, the null resource 317 remains empty after filling with the PDCCHs 311, 313, and 315 is wasted. Afterward, the base station performs interleaving by an interleaver 321 on the PDCCHs 311, 313, and 315 and the null resource 317 to generate a second control channel series 323 and then performs a cyclic shift on the second series based on the individual cell IDs to generate a third control channel series 329. Next, the base station maps the third control channel series to the resources in units of REG 305 in the time domain (331) first to form the control channel region 333. Accordingly, the PDCCHs 311, 313, and 315 are transmitted in a distributed manner across the control channel region 333. At this time, the null resource 317 is also distributed across the entire control channel region 333.

Figure 4:
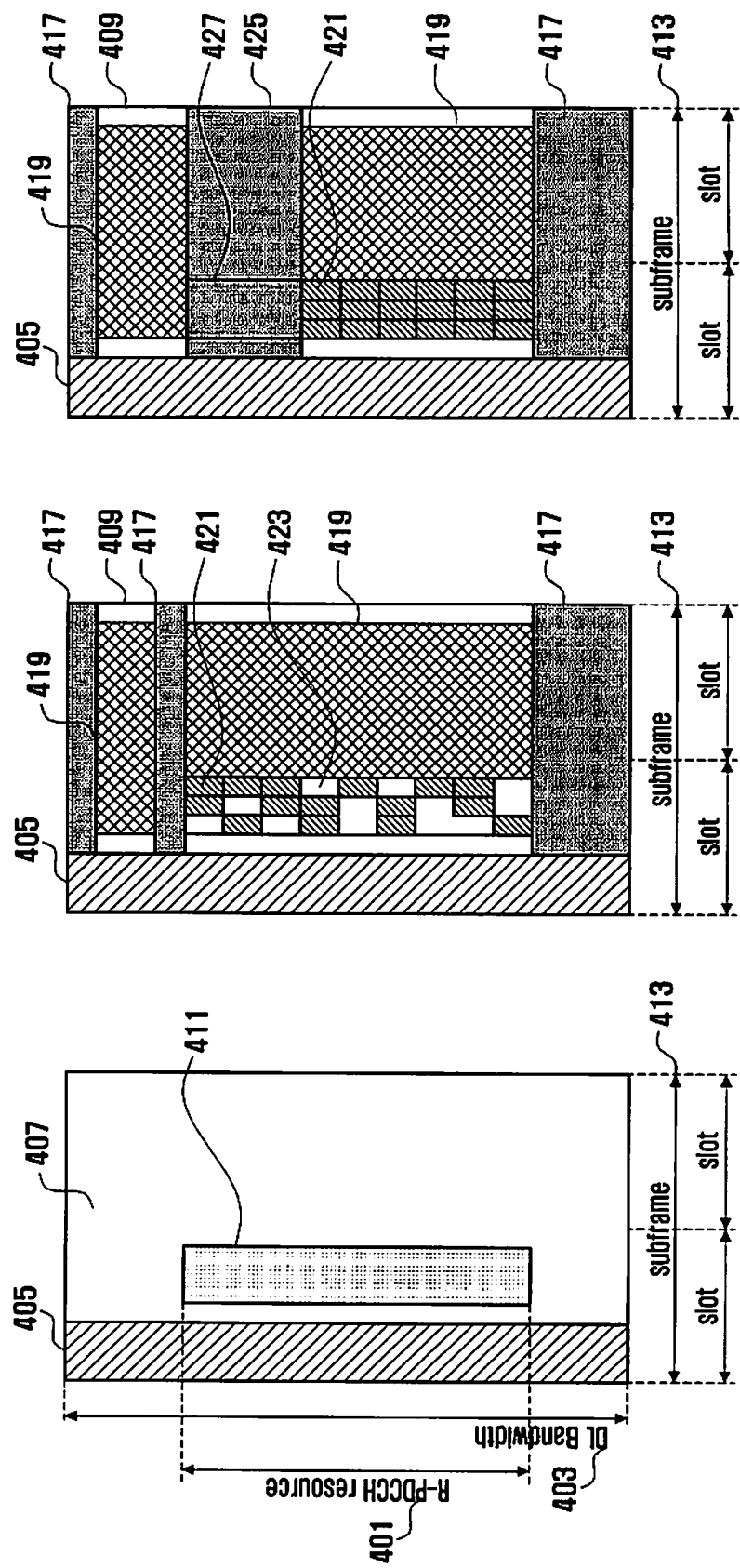
FIG. 4 is a diagram illustrating structures of a backhaul subframe for use in the LTE-A system according to an embodiment of the present invention.

In the LTE-A system, the control channel structure of the LTE system can be reused for the relay. In order to reuse the control channel structure of the LTE system while supporting time-varying resource assignment without resource waste, there is a need of additional constraints and conditions. FIG. 4 is a diagram illustrating structures of the backhaul subframe for use in the LTE-A system according to an embodiment of the present invention.

Referring to FIG. 4, a backhaul subframe is composed of a control channel region 405 and a data channel region 407 (which includes 409, 417, 419, 421, and 423), and the data channel region 407 includes a relay control channel region (R-region) 411. The position of the R-region 411 in the data channel region 407 can be informed by an upper layer or other method. The resource amount, i.e. the size 401, of the R-region 411 is determined in semi-static manner so as to be less than the LTE bandwidth 403 but not identical with the size of the resource actually used for transmission.

In the case that the relay control channel 421 is transmitted in the R-region 411 by imitating the control channel region 405 for the mobile terminals, the amount of the relay control channel 421 can be less than (but not equal to) the size of R-region 411. Accordingly, the null resources 423 are distributed in the entire R-region 411, resulting in waste of resources. If the resources can be assigned so as to be adaptive to the variable amount of the relay control channel 421 even when the size 401 of the R-region 411 is fixed, it is possible to assign the null resource 423 as mobile resource 427 for another mobile terminal.

Figure 5:
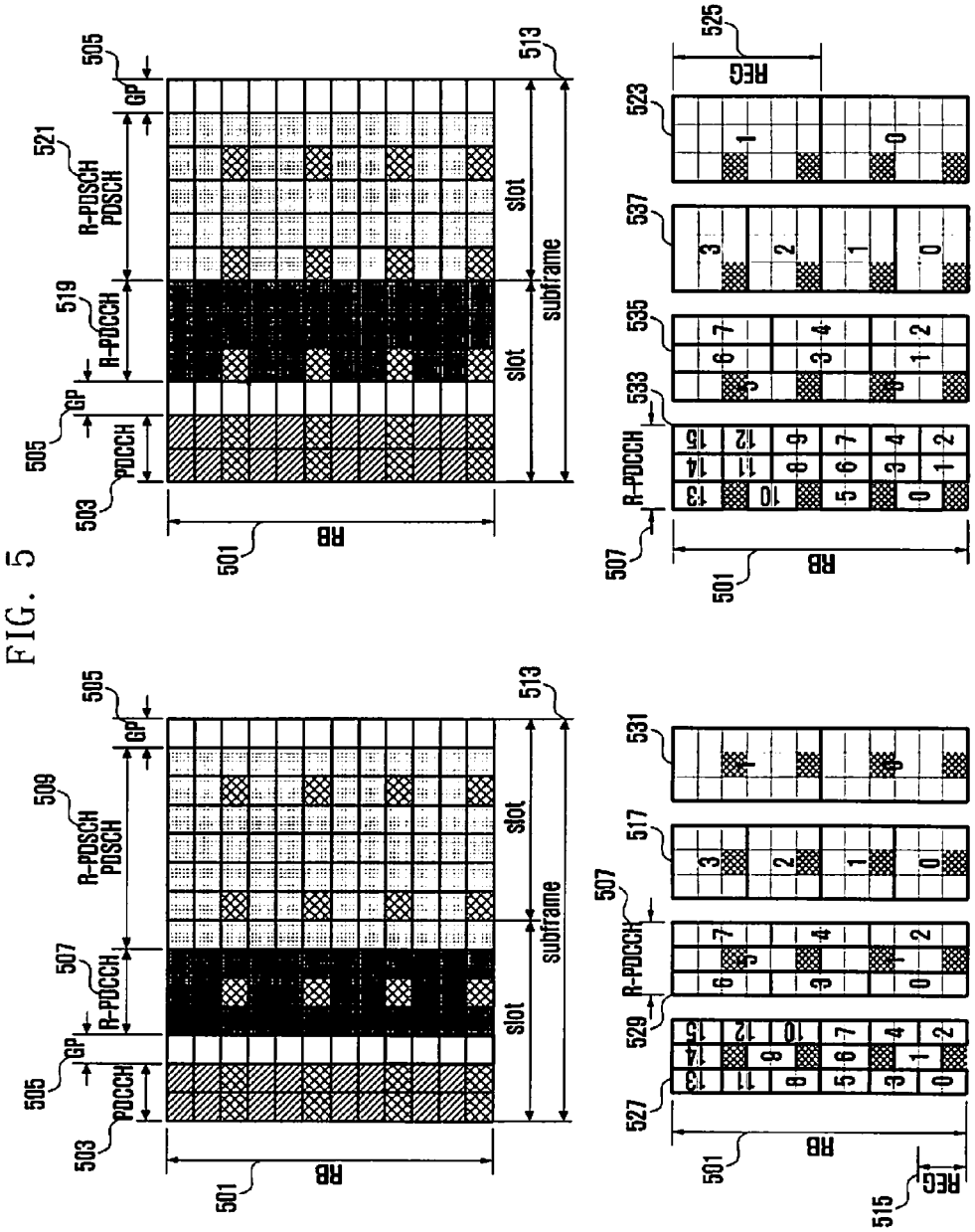
FIG. 5 is a diagram illustrating structures of an R-channel in a backhaul subframe for used in the LTE-A system according to an embodiment of the present invention.

FIG. 5 is a diagram illustrating structures of an R-channel in a backhaul subframe for used in the LTE-A system according to an embodiment of the present invention.

Referring to FIG. 5, the backhaul subframe is structured in the form of a normal CP subframe and an extended CP subframe to transmit Relay-PDCCHs (R-PDCCHs) 517, 523, 527, 529, 531, 533, 535, and 537 in the R-region 507 and 519. The symbol carrying the R-PDCCHs 517, 523, 527, 529, 531, 533, 535, and 537 can be mapped to the fourth symbol following the first two symbols corresponding to the control channel region 503 for the mobile terminals and the third symbol corresponding to the Guide Period 505 required for receiving the R-PDCCHs 517, 523, 527, 529, 531, 533, 535, and 537. The number of symbols assigned for the R-region can be 1 to 4. In this embodiment it is assumed that 3 symbols are assigned for the R-region 507 (or 519). In the case that 3 symbols are assigned for the R-region 507 (or 519) regardless of the type of the subframe, the numbers of REs for transmitting the R-PDCCHs in both the normal CP subframe and the extended CP subframe are identical with each other.

Since the resource assignment unit for data channel transmission in the data channel region 509 (or 521) is an RB, it is preferred to increase the aggregation level of the R-PDCCHs in multiples of RB 501 for multiplexing with the data channels of the mobile terminals. In an embodiment of the present invention, there is a structure in which 1 R-PDCCH is assigned 1 RB 501 from the reference point of aggregation level 1. The R-PDCCH of aggregation level 1 is composed of one R-CCE and the number of RBs increases in proportion to the aggregation level. One R-CCE includes a plurality of R-REGs, and the motivation for doing this is to assign available resources to several relays in a mixed manner so as to obtain diversity gain. For the R-PDCCHs, the R-REG 515 (or 525) can be composed of 2, 4, 8, or 16 Res. In this case, the R-REG 515 (or 525) is assigned across 3 consecutive symbols and identified along the frequency axis.

An R-CCE is composed of a plurality of R-REGs. Although one RB basically includes a single R-CCE, it is possible to include plural R-CCEs in an embodiment of the present invention. In the case of an R-REG composed of 16 REs, one RB corresponds to one R-CCE when 2 R-REGs constitute one R-CCE, but one RB corresponds to two R-CCEs when one R-REG constitutes one R-CCE. In this case, the control channel multiplexing includes the R-CCE unit multiplexing as well as the R-REG unit multiplexing in a single RB.

The R-PDCCHs 517, 523, 527, 529, 531, 533, 535, and 537 can be structured in the same R-REG format or different R-REG formats. This is because, as the number of REs constituting an R-REG 515 (or 525) decreases, the number of R-PDCCHs 517, 523, 527, 529, 531, 533, 535, and 537 contained in an RB 501 increases and thus the diversity gain increases. In the case that the performance of the relay backhaul channel is good, the aforementioned process is not needed. In this case, frequency selective resource allocation is more efficient, and it is advantageous to use the structure having a large number of REs constituting the R-REG 515 (or 525). Such a structure can be used in the normal CP subframe and the extended CP subframe and thus is advantageous to maintain the channel coding in the backhaul subframe 513 regardless of the structure of the subframe.

That is, in the R-PDCCHs 517, 523, 527, 529, 531, 533, 535, and 537, a single R-CCE matches with the size of the RB 501. This means that the numbers of R-REGs 515 (or 525) for both the R-CCE and RB 501 are identical with each other. This is possible by adjusting the number of REs constituting the R-REG 515 (or 525). In this manner, the R-PDCCHs are assigned the resource in units of RBs in the R-region 507 (or 519).

Figure 6:
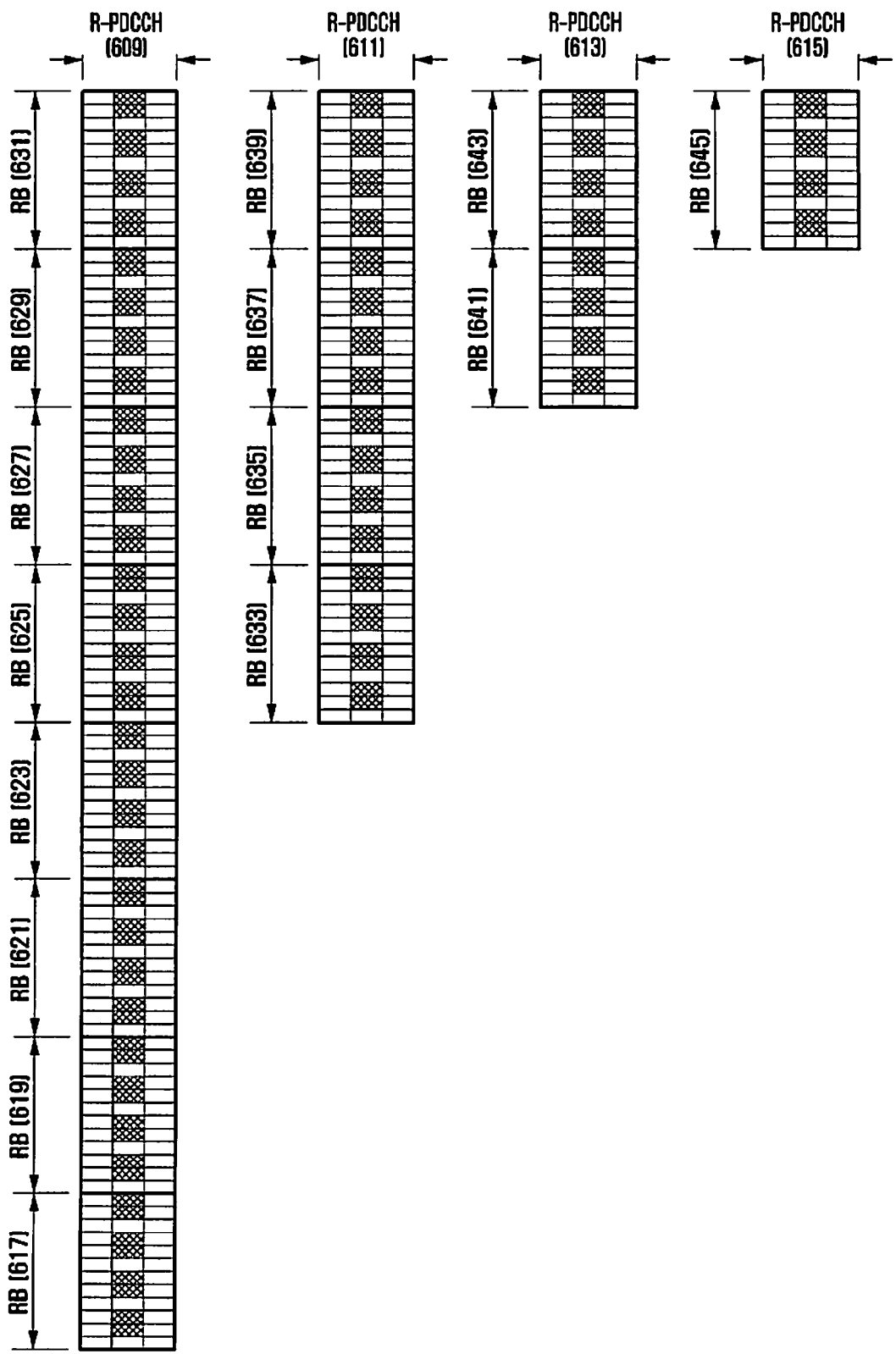
FIG. 6 is a diagram illustrating a principle of mapping an R-PDCCH structured in FIG. 5 to a resource depending on an aggregation level according to an embodiment of the present invention.

FIG. 6 is a diagram illustrating a principle of mapping the R-PDCCH structured in FIG. 5 to the resource depending on the aggregation level according to an embodiment of the present invention.

Referring to FIG. 6, aggregation is a method to increase the coding gain by assigning additional resources to the terminal of which the receiver for receiving the R-channel is in a bad channel condition. For example, when aggregation level 8 is used, the R-PDCCH 609 is composed of 8 RBs 617, 619, 621, 623, 625, 627, 629, and 631. When aggregation level 4 is used, the R-PDCCH 611 is composed of 4 RBs 633, 635, 637, and 639. When aggregation level 2 is used, the R-PDCCH 613 is composed of 2 RBs 641 and 643. When aggregation level 1 is used, the R-PDCCH 615 is composed of 1 RB 645. However, since the relay does not have information about the aggregation level used by the base station to increase the coding gain, the relay needs to perform blind decoding. Also, since the relay does not have the information on the aggregation level of the control channel transmitted to another relay, it does not know the total amount of the resources used for the R-channel. FIG. 6 shows a case where an RB consists of a single R-CCE. In the case that an RB consists of two R-CCEs, the total resources to be used becomes half of that as depicted in FIG. 6. In this manner, the resource amount decreases in inverse proportion to the number of R-CCEs.

Descriptions will now be made with regard to particular embodiments of the present invention.

First Embodiment

Figure 7:
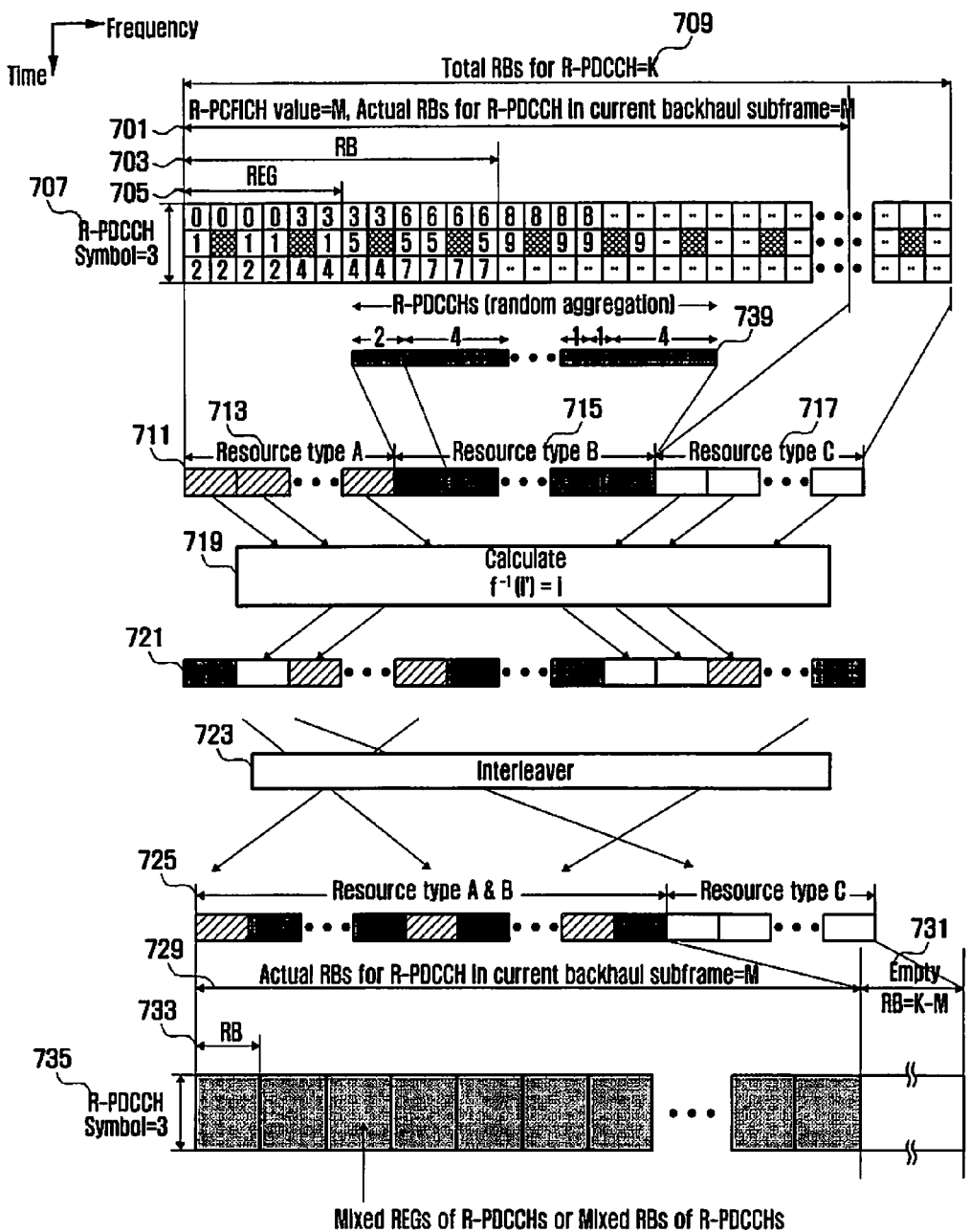
FIG. 7 is a diagram illustrating a method for transmitting an R-channel according to a first embodiment of the present invention.

FIG. 7 is a diagram illustrating a method for transmitting an R-channel according to a first embodiment of the present invention. In this embodiment, as the R-PDCCH is composed in units of RBs, a demultiplexer is used to concentrate the resource regions that are not used into an RB in order to avoid unnecessary resource waste.

Referring to FIG. 7, the R-region 709 includes the previously assigned resources for transmitting the R-PDCCH in the upper layer and is composed of K RBs 703 across L symbols 707 and 735. In the R-region 709, M RBs 703 and 733 are actually used to transmit the R-channels 701 and 729. Here, M is less than or equal to K and can be changed according to the channel condition in the current backhaul subframe between the base station and relay or the number of the relays involved in the transmission. In this embodiment, it is assumed that the relay knows the value M through other channels such as R-PCFICH.

That is, the R-region 709 is composed of M RBs 703 for the R-channel 701 and 729 and K-M RBs. The R-channel 701 and 729 is composed of the resources of resource type A 713 and resource type B 715 and 739. The type A resource 713 is the resource assigned at the fixed positions negotiated between the base station and the relay such as R-PCFICH and R-PHICH, except for the R-PDCCH. The type A resource 713 may not be used if not required. The type B resource 715 and 739 is composed of the R-PDCCHs of different aggregation levels that are random from the view point of the relay. That is, the base station determines the size of the type B resource 715 and 739 with a plurality of R-PDCCHs formed according to the aggregation levels. In the R-region 709, the type C resource 717 and 731 excluding the R-channel 701 and 729 is an idle resource which is reported from the upper layer for transmission of R-channel 701 and 729, but is actually not used.

In order to assign the resources in the R-region 709, the base station arranges the type A resource 713, type B resource 715 and 739, and type C resource 717 and 731 in series as denoted by reference number 711. Since the type A resource 713 and the type C resource 717 and 731 are arranged at predetermined positions in the R-region 709, the base station calculates their positions by performing de-interleaving in advance as denoted by reference number 719, such that the type A resource 713 and the type C resource 717 and 731 are located at the predetermined positions even after passing the interleaving process, and then changes the positions of the type A resource 713 and the type C resource 717 and 731 as denoted by reference number 721. In order for the base station to assign an RB per R-PDCCH, the type B resource 715 and 739 is interleaved with the type C resource 717 and 731 as denoted by reference number 723 so as to be arranged in the R-region 709 as denoted by reference number 725. Here, the interleaving can be performed according to a conventional interleaving method.

In the case that the resource is mapped according to the resource mapping order in the RB 703 and 733, the type A resource 713 is mapped to a designated position among the M RBs, and the type B resource 715 and 739 is mapped to the rest among the M RBs in a distributed manner. Also, the type C resource 717 and 731 is mapped to the K-M RBs at an edge excluding the R-channel 701 and 729 in the R-region 709. Afterward, K-M type C resources are assigned for other terminals within the cell so as to maximize the resource efficiency.

Second Embodiment

Figure 8:
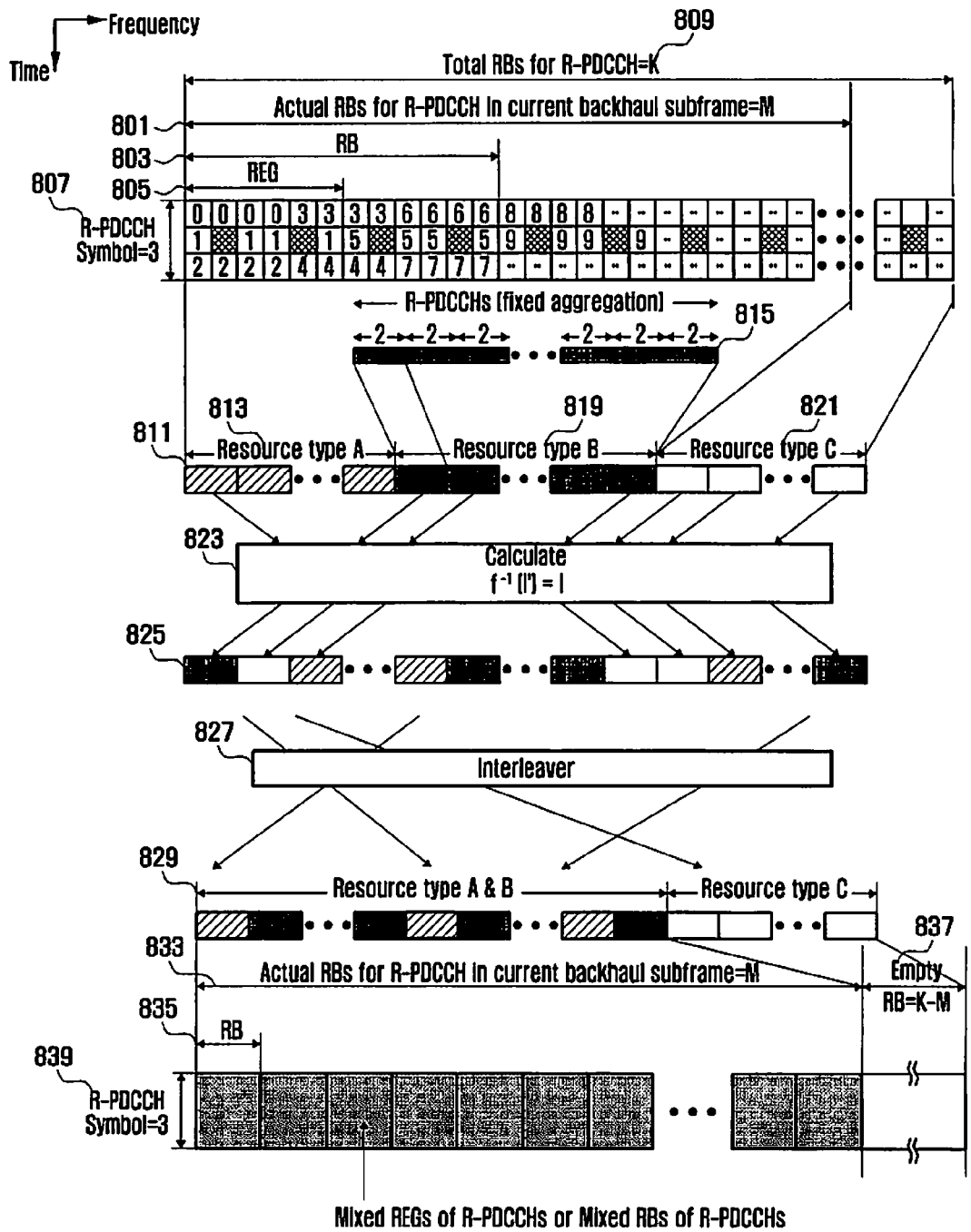
FIG. 8 is a diagram illustrating a method for transmitting an R-channel according to a second embodiment of the present invention.

FIG. 8 is a diagram illustrating a method for transmitting an R-channel according to a second embodiment of the present invention. Since the resource structure of the R-channel that is described in the first embodiment is used in the second embodiment, a detailed description of the resource structure of the R-channel is omitted herein.

Referring to FIG. 8, the R-region 809 includes the resources assigned previously for transmitting the R-PDCCH by the upper layer and is composed of K RBs 803 and 835 across the L symbols 807 and 839. Actually, M RBs 803 and 835 are used for transmitting the R-channel 801 and 833 in the R-region 809. In this embodiment, there is no need for the base station to report the value M of the relay through a separate channel. For this, the aggregation levels of the entire R-PDCCHs are fixed to one level in the type B resource 815 and 819. Also, resource interleaving is performed in units of R-PDCCHs.

As a result of interleaving, since the R-PDCCHs for other relays are not multiplexed into the single RB 835, but are distributed with the single RB 835 across the entire frequency resource region, frequency selective gain is obtained in the system. The K-M type C resource 821 and 837 is assigned to other terminals within the cell, resulting in maximization of resource efficiency. The R-channel multiplexing method of this embodiment is also advantageous to perform blind decoding on the R-PDCCHs without assistance of the R-PCFICH. Typically, when failing receipt of the R-PCFICH, the relay cannot receive the R-PDCCH as well as R-PCFICH.

Third Embodiment

Figure 9:
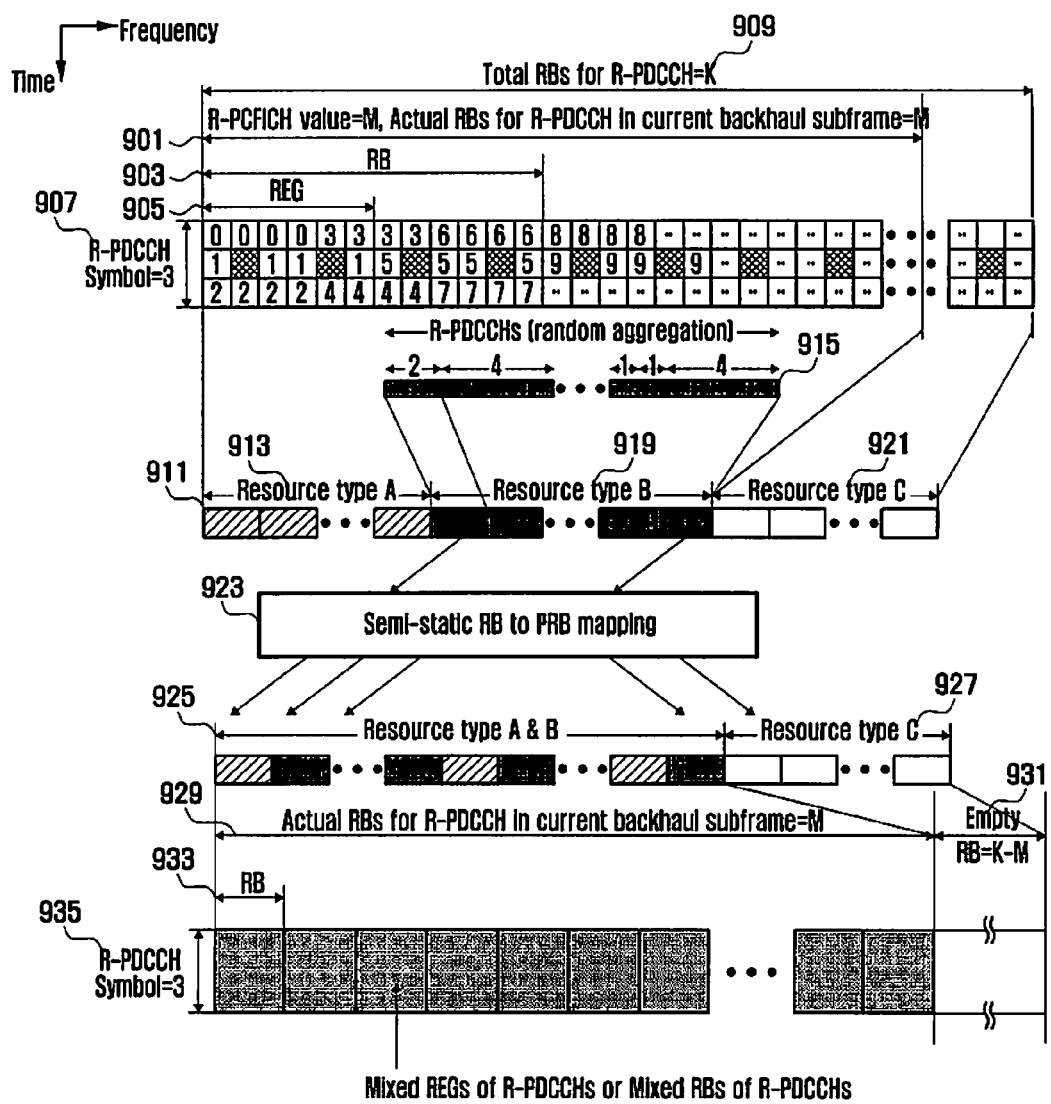
FIG. 9 is a diagram illustrating a method for transmitting an R-channel according to a third embodiment of the present invention.

FIG. 9 is a diagram illustrating a method for transmitting an R-channel according to a third embodiment of the present invention. Since the resource structure of the R-channel that is described in the first and second embodiments is used in the third embodiment, a detailed description on the resource structure of the R-channel is omitted herein.

Referring to FIG. 9, the R-region 909 includes the resources assigned previously for transmitting the R-PDCCH by the upper layer and is composed of K RBs 903 and 933 across the L symbols 907 and 935. Actually, M RBs 903 and 933 are used for transmitting the R-channel 901 and 929 in the R-region 909. In this embodiment, it is assumed that the value M is informed to the relay through a separate channel such as the R-PCFICH. The type B resource 915 and 919 is composed of the R-PDCCHs of different aggregation levels that are random from the view point of the relay. That is, the base station determines the size of the type B resource 915 and 919 with a plurality of R-PDCCHs formed according to the aggregation levels. In the case of the type B resource 915 and 919, as a result of the resource mapping, there can be different R-PDCCHs in a single RB. In this embodiment, the R-REG 905 is formed with 8 or 16 REs.

In order to assign the resources in the R-region 909, the base station arranges the type A resource 913, type B resource 915 and 919, and type C resource 921 and 931 in series as denoted by reference number 911. Next, the base station changes the positions of the type A resource 913 and the type B resource 915 and 919 according to a predetermined mapping rule as denoted by reference number 923. At this time, the base station does not change the position of the type C resource 921 and 931. That is, the base station arranges the type A resource 913, the type B resource 915 and 919, and the type C resource 921 and 931 to the designated positions as denoted by reference number 925. The base station must have the predetermined mapping rule to arrange the resources. Since the value M varies according to the number of the R-PDCCH, the base station has the mapping rule per value M. The R-channel 901 and 929 is actually assigned in the RB 903 and 933 such that, when the RB 903 and 933 is composed of 4 R-REGs 905, four R-PDCCHs exist in a single RB 903 and 933. When the RB 903 and 933 is composed of 8 R-REGs 905, two R-PDCCHs exist in the signal RB 903 and 933.

Accordingly, the type C resource 921 and 931 is mapped to the K-M RBs 903 and 933 at an edge excluding the R-channel 901 in the R-region 909. Afterward, K-M type C resource 921 and 931 are assigned to other terminals within the cell so as to maximize the resource efficiency. Also, it is advantageous to allocate resources in a frequency selective manner according to the mapping rule of Virtual Resource Block (VRB).

Fourth Embodiment

Figure 10:
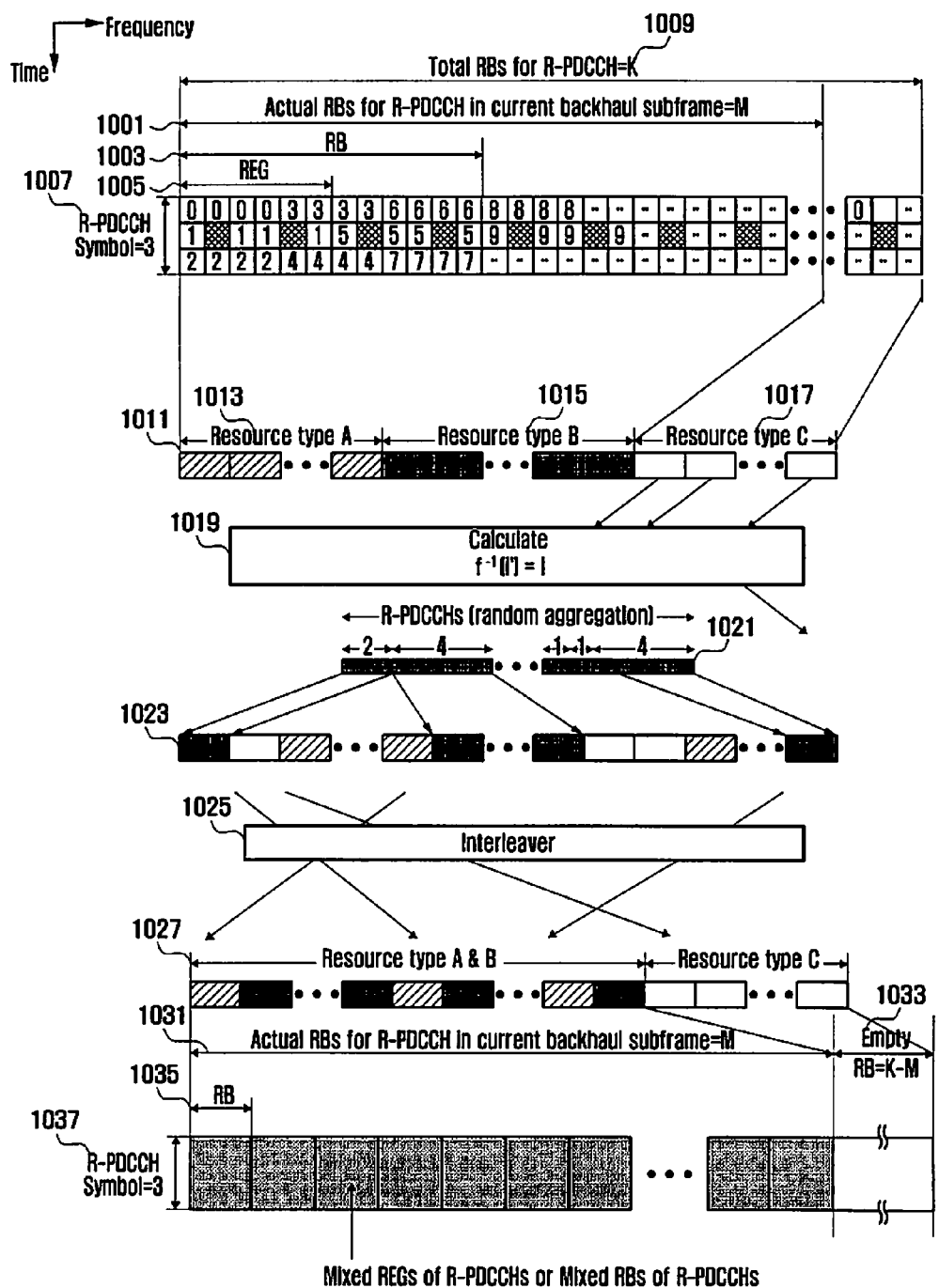
FIG. 10 is a diagram illustrating a method for transmitting an R-channel according to a fourth embodiment of the present invention.

FIG. 10 is a diagram illustrating a method for transmitting an R-channel according to a fourth embodiment of the present invention. In this embodiment, the type C resource 1017 is interleaved so as to be correctively arranged in units of RBs in the R-region 1009, and then the R-channel 1001 is arranged in the remaining resources.

Referring to FIG. 10, the R-region 1009 includes the resources assigned previously for transmitting the R-PDCCH by the upper layer and is composed of K RBs 1003 and 1035 across the L symbols 1007 and 1035. Actually, M RBs 1003 and 1035 are used for transmitting the R-channel 1001 in the R-region 1009. That is, the base station determines the size of the type B resource 1015 and 1021 based on the value M.

In order to assign resources in the R-region 1009, the base station distinguishes the R-channel 1001 and 1031 and the idle resources and arranges the type A resource 1013, type B resource 1015, and type C resource 1017 as denoted by reference number 1011. Since the type A resource 1013 and the type C resource 1017 and 1033 are located at predetermined positions in the R-region 1009, the base station calculates their positions by performing de-interleaving in advance as denoted by reference number 1019, such that the type A resource 1013 and the type C resource 1017 and 1033 are located at the predetermined positions even after passing the interleaving process, and then changes the positions of the type A resource 1013 and the type C resource 1017 and 1033 as denoted by reference number 1023. That is, the base station arranges the type A resource 1013 at a predetermined fixed position and then the type C resource 1017 and 1033 in units of RBs collectively. In addition, the base station arranges the R-PDCCH at the position where the type A resource 1013 and type C resource 1017 and 1033 are not designated, i.e. the remaining region, in the R-region 1009.

In the case that the R-PDCCH is arranged in the remaining region, the size of the remaining region may be either less than or greater than the size corresponding to the aggregation level determined for the R-PDCCH. Accordingly, the base station arranges the R-PDCCHs in descending order of the aggregation level and decreases the aggregation level in the R-PDCCH. Here, since the relay which receives the R-PDCCHs performs blind decoding on the R-PDCCHs, it has nothing to do with the transmitted aggregation level.

After the arrangement has been completed, the base station performs interleaving on the type A resource 1013, the type B resource 1015, and the type C resource 1017 and 1033 as denoted by reference number 1025 and re-arranges the resources as denoted by reference number 1027. At this time, the interleaving can be performed according to a conventional interleaving method. in this manner, the R-PDCCH is arranged so as to be in a single RB 1003 and 1035 in the R-region 1009.

Accordingly, the type C resource 1017 and 1033 is mapped to the K-M RBs 1003 and 1035 at the edge excluding the R-channel in the R-region 1009. Afterward, the K-M type C resource 1017 and 1033 is allocated to other terminals in the cell so as to maximize the resource efficiency.

Fifth Embodiment

A method for multiplexing an R-channel according to a fifth embodiment of the present is described hereinafter.

In the case where the R-region is composed of 4 symbols in the time domain in a normal CP subframe, in order to make the coding rate according to the case where the R-region is composed of 3 symbols in the time domain in an extended CP subframe, the normal CP subframe is designed such that the R-channel includes 3 symbols and M RBs. However, the size of the interleaver for forming the R-region in the normal CP subframe is determined to be 4 symbols and M RBs such that the last symbol part which is not assigned for the R-region can be used for other R-PDCCHs for diversity transmission. That is, although 3 symbols are assigned for the R-region in the normal CP subframe, the R-channel can be arranged across 4 symbols including an adjacent symbol of the R-region. In this manner, the power to be allocated for the unused symbol part can be used for the transmission of the R-channel, resulting in a reduction of resource waste. As a consequence, it is possible to maximize the resource efficiency in the backhaul subframe.

Meanwhile, in the case that the backhaul subframe has a bandwidth of 1.4 MHz in the LTE-A system, two of the three symbols of the R-region can be used for the R-channel. Also, the structure in which a single R-CCE occupies two RBs can be applied in the method of the present invention.

Sixth Embodiment

FIG. 11 is a diagram illustrating R-CCE structures that are available in the embodiments of the present invention.

Referring to FIG. 11, the structures denoted by reference numbers 550, 553, 555, 557 and 559 shows the cases where some symbols of the entire RB resource are used, however, the R-CCE structure according to this embodiment is characterized in that one CCE occupies half of the RBs or one RB as shown in by reference numbers 561 and 563. The new PDCCH including the R-PDCCH can start from a specific symbol in the RB according to the system and, in the case that the entire RB is used, occupies to the last symbol. The symbol which is not used due to the guard period can be reported to the terminal or relay by means of an upper layer signal.

Reference numbers 553 and 555 denote the structures in which Common Reference Signal (CRS) is used. In the case that an RB is composed of one CCE, the R-REG is composed of 4 contiguous REs excluding the CRS such that the mapping unit becomes the CCE. That is, in multiple CCEs, one CCE is mapped with multiple REGs and another CCE is mapped with the remaining REGs. At this time, the REGs can be mapped to the corresponding RBs in a time domain-preferred manner as denoted by reference number 553 or in a frequency domain-preferred manner as denoted by reference number 555. The R-PDCCH mapping is performed with the upper layer signaling about the start and end of the symbols, or the start and end of the R-REGs occupied by the control channel. Also, the fixed start and end symbols can be used in the system.

Reference numbers 557, 559, 561, and 563 denote the R-CCE structures when Dedicated Reference Signal (DRS) is used. In the case of using DRS, 4 contiguous REs that do not include the DRS and CRS constitute an R-REG, and the mapping unit becomes the CCE. That is, in multiple CCEs, one CCE is mapped with multiple REGs and another CCE is mapped with the remaining REGs. At this time, the REGs can be mapped to the corresponding RBs in a time domain-preferred manner as denoted by reference numbers 557 and 561 or in a frequency domain-preferred manner as denoted by reference numbers 559 and 563.

Although half of an RB is composed of one CCE in the structures 559, 561, and 563, it can be applied to the case where an RB is composed of one CCE as shown in the structure 557. In the case that two CCEs, i.e. CCE1 and CCE2, occupy a single Physical Resource Block (PRB), 6 REs are mapped in the frequency domain as shown in the structure denoted by reference number 559. At this time, the DRS is used for demodulating the control channels as follows.

In case of Rank-1 transmission, the DRS used by the CCE1 can be located at the $6^{th}$ symbols of the $2^{nd}$, $7^{th}$, $12^{th}$ subcarriers and the $13^{th}$ symbols of the $6^{th}$ and $11^{th}$ subcarriers; and the DRS used by the CCE2 can be located at the $7^{th}$ symbols of the $2^{nd}$, $7^{th}$, $12^{th}$ subcarriers and the $14^{th}$ symbols of the $1^{st}$, $6^{th}$, and $11^{th}$ subcarriers. Also, the DRS used by CCE1 can be located at the $13^{th}$ symbols of the $2^{nd}$, $7^{th}$, and $12^{th}$ subcarriers and the $6^{th}$ symbols of the $1^{st}$, $6^{th}$, and $11^{th}$ subcarriers; and the DRS used by CCE2 can be located at the $14^{th}$ symbols of the $2^{nd}$, $7^{th}$ and $12^{th}$ subcarriers and the $7^{th}$ symbols of $1^{st}$, $6^{th}$, and $11^{th}$ subcarriers. Also, the DRS used by CCE1 can be located at the $13^{th}$ symbols of the $2^{nd}$, $7^{th}$, and $12^{th}$ subcarriers and $6^{th}$ symbols of the $1^{st}$, $6^{th}$ and $11^{th}$ subcarriers; and the DRS used by CCE2 can be located at the $14^{th}$ symbols of the $2^{nd}$, $7^{th}$, and $12^{th}$ subcarriers and the $7^{th}$ symbols of the $1^{st}$, $6^{th}$, and $11^{th}$ subcarriers. Also, the DRS used by CCE1 can be located at the $14^{th}$ symbols of the $2^{nd}$, $7^{th}$, and $12^{th}$ subcarriers and the $7^{th}$ symbols of the $1^{st}$, $6^{th}$, and $11^{th}$ subcarriers; and the DRS used by CCE2 can be located at the $13^{th}$ symbols of the $2^{nd}$, $7^{th}$, and $12^{th}$ subcarriers and the $6^{th}$ and $7^{th}$ symbols of the $1^{st}$, $6^{th}$, and $11^{th}$ subcarriers.

In the case of Rank-2 transmission, the DRS used by CCE1 can be located at the $6^{th}$ symbols of the $2^{nd}$, $7^{th}$, and $12^{th}$ subcarriers and $13^{th}$ and $14^{th}$ symbols of the $1^{st}$, $6^{th}$, and $11^{th}$ subcarriers; and the DRS used by CCE2 can be located at the $13^{th}$ and $14^{th}$ symbols of the $2^{nd}$, $7^{th}$, and $12^{th}$ subcarriers and the $6^{th}$ and $7^{th}$ symbols of the $1^{st}$, $6^{th}$ and $11^{th}$ subcarriers. Also, the DRS used by CCE1 can be located at the $13^{th}$ and $14^{th}$ symbols of the $2^{nd}$, $7^{th}$, and $12^{th}$ subcarriers and the $6^{th}$ and $7^{th}$ symbols of the $1^{st}$, $6^{th}$, and $11^{th}$ subcarriers; and the DRS used by CCE2 can be located at the $6^{th}$ and $7^{th}$ symbols of $2^{nd}$, $7^{th}$, and $12^{th}$ subcarriers and the $13^{th}$ and $14^{th}$ symbols of the $1^{st}$, $6^{th}$, and $11^{th}$ subcarriers.

Seventh Embodiment

In a seventh embodiment of the present invention, a new control channel is provided with its start and end points, with the new control channel including the R-PDCCH. Typically in the carrier supporting LTE, it can be taken into consideration that the start point after the control channel region informed by the PCFICH is located or the start point can be fixed in consideration of the guard period, and the end symbol is located such that the coding rate of the entire control channel is maintained with the occupancy of specific REGs and to transmit specific symbols. In the carrier which does not support LTE, the start point corresponds to the first symbol of each subframe, and the end point corresponds to the end symbol of the carrier supporting LTE.

Eighth Embodiment [Multiplexing with R-PDSCH]

Figure 12:
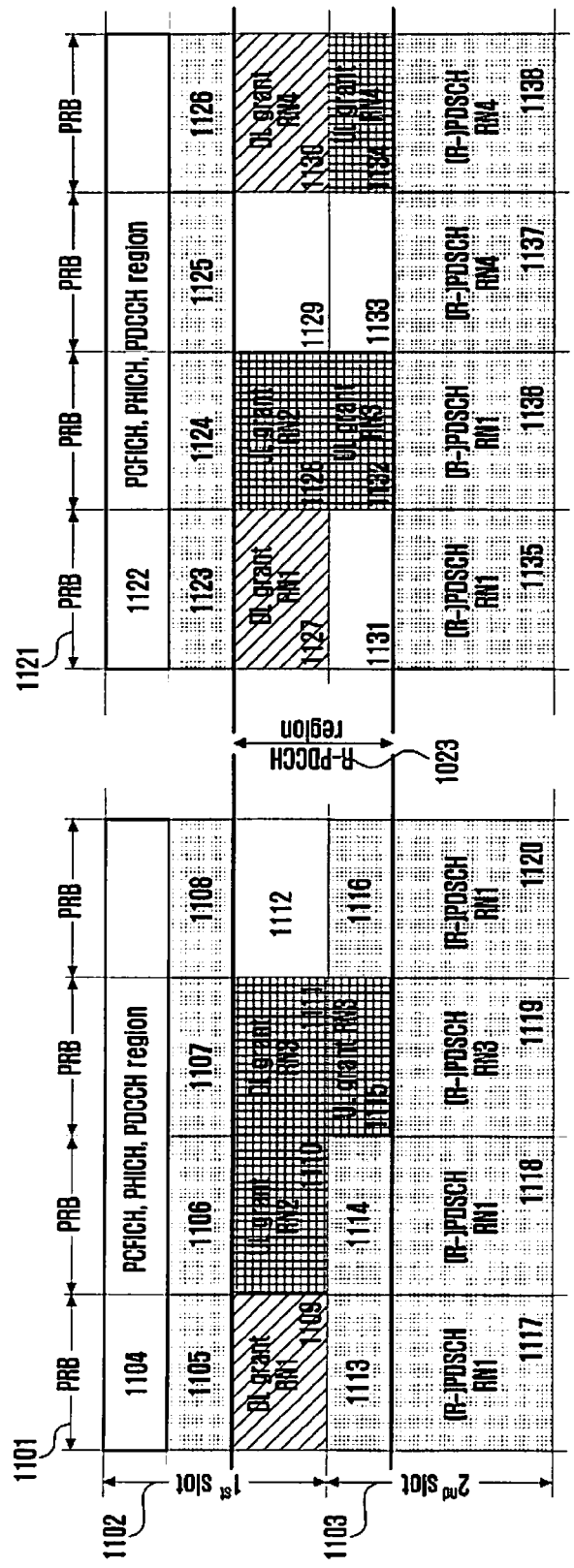
FIG. 12 is a diagram illustrating a method for multiplexing R-channels with a PDSCH according to an eighth embodiment of the present invention.

FIG. 12 is a diagram illustrating a method for multiplexing the R-channels with PDSCH according to an eighth embodiment of the present invention.

Referring to FIG. 12, a PRB is pre-configured for transmitting the R-channel. At this time, the control channel region (see FIG. 5) can be transmitted in the regions across the last several symbols of the $1^{st}$ slot as denoted by reference numbers 1109, 1110, 1111, and 1112 or can be transmitted across the first several symbols of the $2^{nd}$ slot as denoted by reference numbers 1113, 1114, 1115, and 1116. At this time, the R-control channel can be classified into one of two types of control channels: DL grant and UL grant. In this embodiment, the description is directed to the method for multiplexing the two types of control channels and the R-data channels.

At this time, the relay receives the R-channel in a backhaul subframe in the following three situations. In the first case where both the DL grant and UL grant are needed, the relay must receive the data channel along with the scheduling information in the DL grant. In the second case where only the UL grant is needed, the backhaul subframe does not have both the DL grant and data channel. In the third case where only the DL grant is needed, the relay must receive the data channel along with the scheduling information in the DL grant.

Reference numbers 1101 and 1121 show the principles of how to multiplex the R-channels in the eighth embodiment of the present invention.

The part denoted by reference number 1101 in FIG. 12 shows a principle for the relay which is needed to receive only a UL grant to perform data reception in the $1^{st}$ slot. If it is required for the relay to receive both the DL grant 1111 and UL grant 1115, the DL grant is transmitted in the $1^{st}$ slot, and the UL grant is transmitted in the PRB 1115 of the $2^{nd}$ slot connected to the PRB 1111 in which the DL grant is transmitted. The data channel is transmitted in the state where it is TDM-multiplexed with the R-control channel in the regions 1117 and 1119. When there are further data to be transmitted, the data can be transmitted in other PRBs. In the case that it is required to transmit only the DL grant 1109, the relay receives the DL grant in the region 1109 and the data channel in the remaining regions 1105, 1113, and 1117 of the corresponding PRB. Since there is no UL grant, the data channel is transmitted in the region 1113 on behalf of the UL grant. In the case that the data channel is received in the region 1120 of the PRB in which no DL grant is received, the relay receives the data channel in the regions excluding the region 1112 since it does not know whether the $1^{st}$ slot carries the UL grant for another relay.

The part denoted by reference number 1121 in FIG. 12 shows a principle for the relay which is needed to receive a UL grant to perform data reception in both the $1^{st}$ and $2^{nd}$ slots. Unlike the case described above with reference to the part 1101, since the $2^{nd}$ slot is allowed to transmit the UL grant, the relay which is needed to receive only the UL grant can transmit one in the $1^{st}$ slot and the other in the $2^{nd}$ slot as denoted by reference numbers 1128 and 1132. In this case, it is advantageous to secure more UL grant transmission resources as compared to the case denoted by reference number 1101. Also, it is characterized that different UL grants are multiplexed in a single PRB. Also, it is characterized that a DL grant destined to an Relay Node (RN) A is transmitted in the $1^{st}$ slot while a UL grant destined to an RN B is transmitted in the $2^{nd}$ slot of the same PRB.

In the method as denoted by reference number 1121, since the relay which is needed to transmit only the DL grant does not know whether any UL grant destined to another relay exists when the corresponding PRB is scheduled for data transmission, it must empty the region 1131 and receive the data channel in the $2^{nd}$ slot. In the case that the data channel is scheduled in a PRB where no DL grant is transmitted, since the relay does not know whether the $1^{st}$ and $2^{nd}$ slots carry any UL grant, it must receive the data channel in the regions 1125 and 1137 excluding the regions 1129 and 1133. Both of the methods show the same performance in resource efficiency, however the method as denoted by reference number 1121 is advantageous to secure more resources for UL grant as compared to the method as denoted by reference number 1101.

A description is now made of the procedure of transmitting the R-channel from a base station to a relay in the backhaul subframe.

Figure 13:
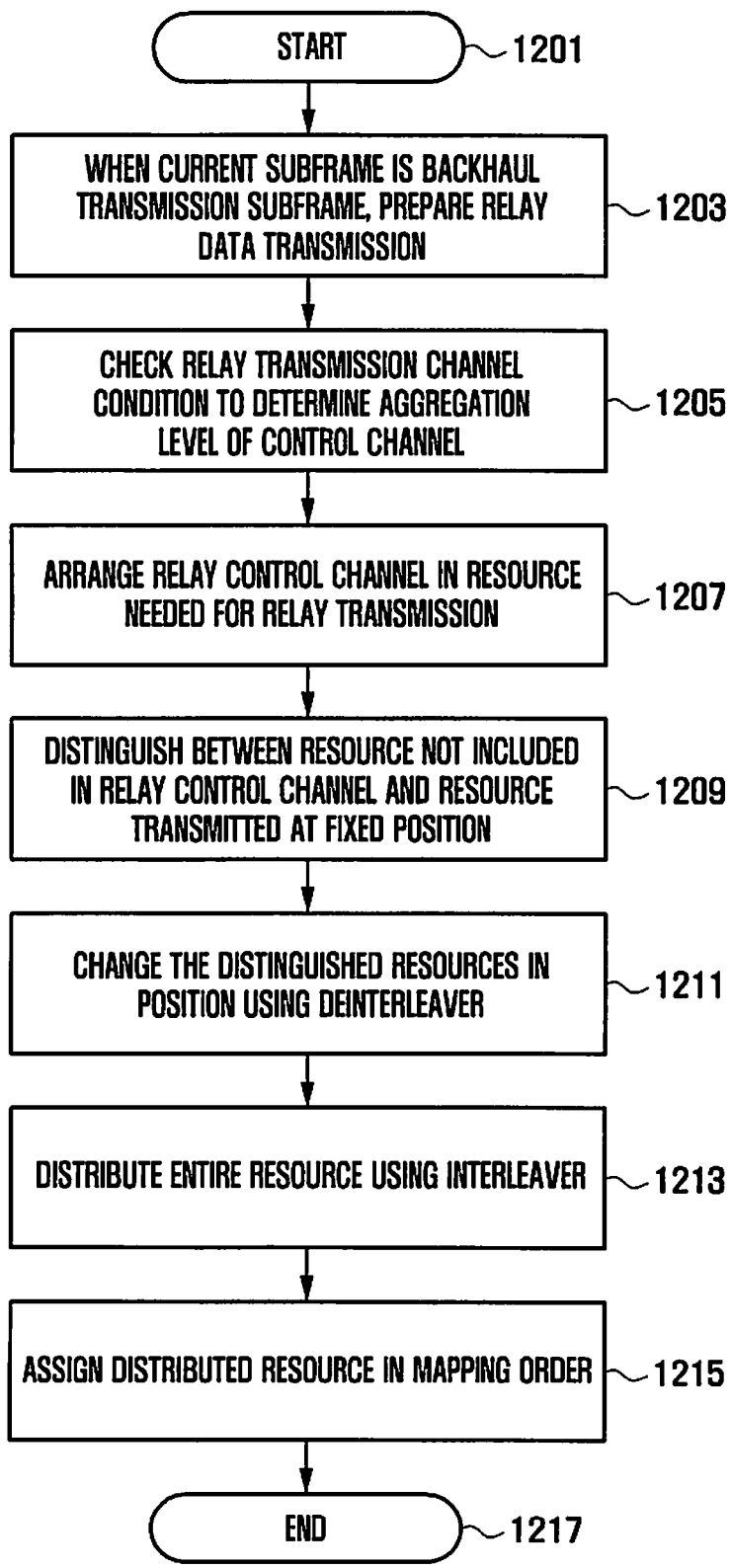
FIG. 13 is a flowchart illustrating a method for a base station to transmit an R-channel according to an embodiment of the present invention.

FIG. 13 is a flowchart illustrating a method for a base station to transmit an R-channel according to an embodiment of the present invention.

Referring to FIG. 13, the base station first checks whether the current subframe is a backhaul subframe and, if it is so, prepares to transmit an R-channel to a relay in step 1203. Next, the base station determines the aggregation level per R-PDCCH in the R-channel and sizes of the R-REG and R-CCE in step 1205. At this time, the base station can use the fixed sizes of the R-REG and R-CCE. Next, the base station configures the R-channel by arranging the control resources for the relay in step 1207. The base station then checks the resources that are not included in the R-channel in consideration of the predetermined size of the R-region, i.e. null resources, and sorts out the control resources and other resources fixed at predetermined positions in the null resources in step 1209. Next, the base station performs deinterleaving on the resources fixed at the predetermined positions by means of a deinterleaver so as to be arranged to the target positions in step 1211. The base station then performs interleaving on the control resources and the null resources by means of an interleaver so as to distribute all kinds of the resources in step 1213. Finally, the base station assigns the control resources and the null resources in the R-region in resource mapping order in step 1215. The resource mapping order can be a time domain-preferred order or a frequency domain-preferred order in the corresponding subframe.

Figure 14:
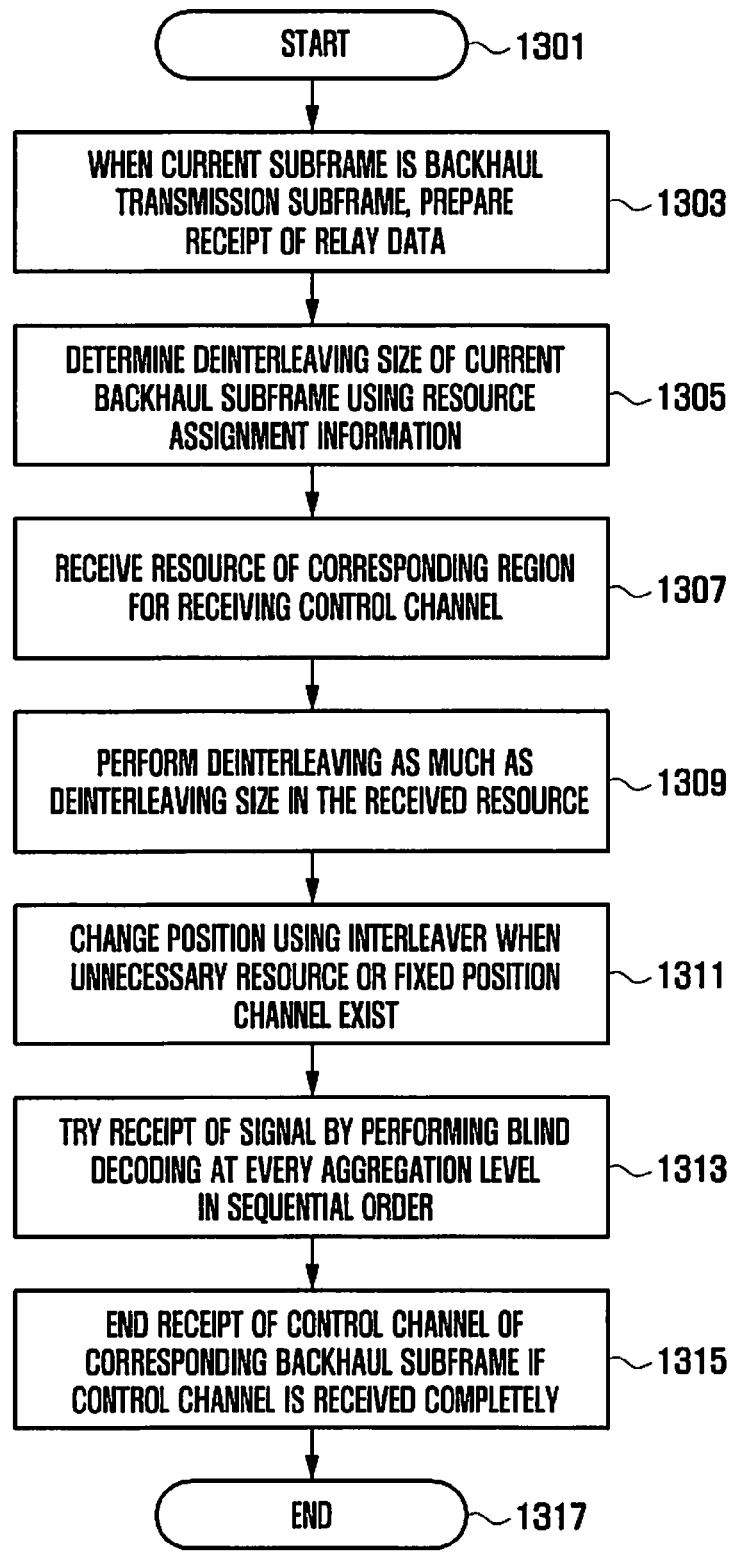
FIG. 14 is a flowchart illustrating a method for a relay to receive an R-channel according to an embodiment of the present invention.

FIG. 14 is a flowchart illustrating a method for a relay to receive an R-channel according to an embodiment of the present invention.

Referring to FIG. 14, the relay checks whether the current subframe is a backhaul subframe and, if it is so, prepares to receive an R-channel in step 1303. Next, the relay determines the location and size of the R-region of the current backhaul subframe using the information on the previously assigned resource notified by the upper layer or the information received through other physical channels in step 1305. Then, the relay receives the channel resource of the R-region in step 1307.

Next, the relay performs deinterleaving on the channel resources in step 1309. Sequentially, the relay rearranges the positions of the unnecessary resources and the channels at the fixed positions in the R-region in step 1311. Next, the relay performs blind decoding to all of the R-CCEs and aggregation levels in sequential order in step 1313. Finally, if its R-channel exists in the data channel region of the backhaul subframe, the relay receives the R-channel and completes the receipt of the control channel of the corresponding backhaul subframe in step 1315.

Figure 15:
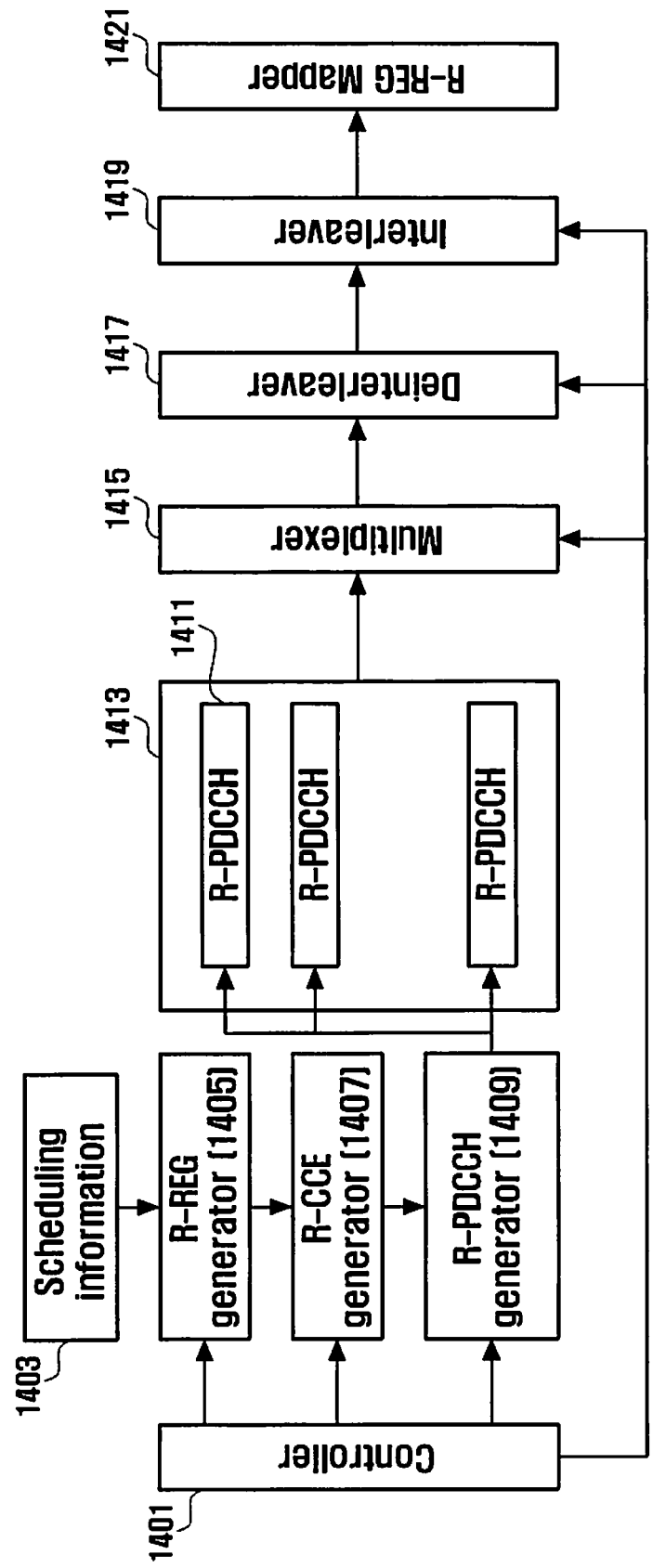
FIG. 15 is a block diagram illustrating a configuration of a base station according to an embodiment of the present invention.

FIG. 15 is a block diagram illustrating a configuration of a base station according to an embodiment of the present invention.

As shown in FIG. 15, the base station includes a controller 1401, a memory 1403 for storing scheduling information, an R-REG generator 1405, an R-CCE generator 1407, an R-PDCCH generator 1409, an R-channel configuration unit 1413, a multiplexer 1415, a resource arrangement unit including deinterleaver 1417 and interleaver 1419, and an R-REG mapper 1421.

The controller 1401 performs scheduling for transmitting the current subframe. The memory 1403 stores scheduling information required for performing the scheduling. The R-REG generator 1405 configures the resources for transmitting the R-PDCCH according to the backhaul control channel configuration method and the R-CCE generator 1407 configures the basic unit of the R-PDCCH under the control of the controller 1401. The R-PDCCH generator 1409 generates at least one R-PDCCH 1411 using the R-CCE, and the R-channel configuration unit 1413 collects and arranges the R-PDCCHs 1411. The multiplexer 1415 sorts out the arranged resources into fixed position resources, non-fixed position resources, and non-used resources, i.e. null resources. The resource arrangement unit including deinterleaver 1417 and interleaver 1419 arranges the fixed position resources and non-fixed position resources and places the null resources close to the fixed position resources and the non-fixed position resources while distinguishing from the fixed position resources and the non-fixed position resources. The deinterleaver 1417 is responsible for arranging the resources such that the resources transmitted at a fixed position is located at a predetermined position after deinterleaving. The interleaver 1419 is responsible for rearranging the fixed position resources at a predetermined position, collecting the null resources in units of RBs, and distributing the non-fixed position resources in each RB in units of R-REGs. The R-REG mapper 1421 maps the physical resources in units of R-REGs in a predetermined order. At this time, the resources can be mapped in a time domain-preferred order or a frequency domain-preferred order. The controller 1401 can assign at least some part of the null resources to the terminals.

Figure 16:
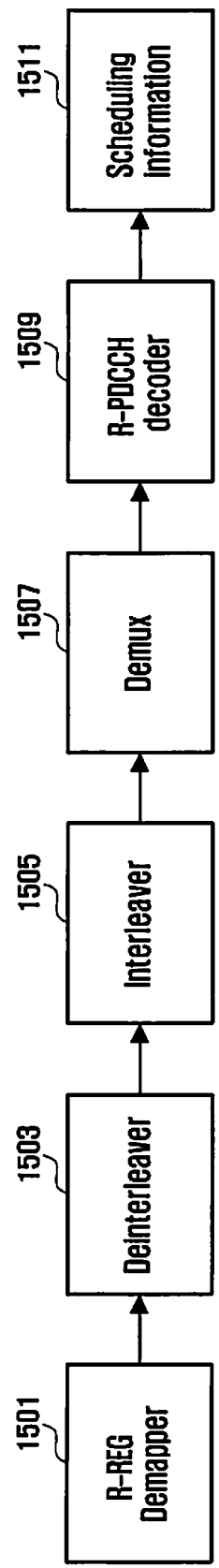
FIG. 16 is a block diagram illustrating a configuration of a relay according to an embodiment of the present invention.

FIG. 16 is a block diagram illustrating a configuration of a relay according to an embodiment of the present invention.

Referring to FIG. 16, the relay includes an R-REG demapper 1501, a resource arrangement unit including deinterleaver 1503, interleaver 1505, and demultiplexer 1507, an R-PD-CCH decoder 1509, and a memory 1511 for storing scheduling information.

The R-REG demapper 1501 receives the resources in the R-region in units of allocation. The resource arrangement unit 1503, 1505, and 1507 sorts out the resources into the fixed position resources, the non-fixed position resources, and the null resources. The resource arrangement unit includes a deinterleaver 1503, an interleaver 1505, and a demultiplexer 1507. The deinterleaver 1503 recovers the original arrangement of the resources. The interleaver 1505 distinguishes between the fixed position resources and the null resources that are not used in the control channel and rearranges the fixed position resources and the null resources. The demultiplexer 1507 removes the fixed position resources and the null resources from the rearranged order. The R-PDCCH decoder 1509 performs blind decoding in units of R-CCEs at the aggregation levels available in the remaining resources to check whether its own R-channel exists. The memory 1511 stores the scheduling information of the R-channel after the R-channel is received completely.

As described above, the method and apparatus for transmitting/receiving a backhaul subframe control channel according to the present invention is capable of assigning control channel resources to relays without resource waste in the data channel for the mobile terminals and adapting identically according to the time-varying control channel amount. Also, the method and apparatus for transmitting/receiving a backhaul subframe control channel according to the present invention is capable of being applied to cases where the control channel is transmitted randomly in a resource block and transmitted in distinguished resource blocks.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for transmitting a control channel, comprising:
    arranging control resources for at least one receiver;
    sorting the control resources and null resources in a control channel region;
    rearranging the control resources to be distributed in a first region of the control channel region and the null resources to be adjacent to the distributed control resources in a second region of the control channel region; and
    mapping the control resources and null resources to the control channel region,
    wherein the null resources are not used for transmitting the control channel.

2. The method of claim 1, wherein sorting the control resources and null resources comprises:
    changing positions of at least one of the control resources and the null resources through deinterleaving; and
    distinguishing the control resources and the null resources through interleaving.

3. The method of claim 1, further comprising assigning at least some of the null resources to other receivers.

4. The method of claim 3, wherein the receiver is a relay, and the other receivers are user terminals.

5. The method of claim 1, wherein the control channel region is formed according to an orthogonal frequency division multiplexing scheme, and the control resources are transmitted in units of one of two, four, eight, and sixteen resource elements and mapped in the control channel region in one of time domain-preferred order and frequency domain-preferred order.

6. An apparatus for transmitting a control channel, comprising:
    a control channel configuration unit which arranges control resources for at least one receiver;
    a multiplexer which multiplexes the control resources and remaining null resources into a control channel region;
    a resource arrangement unit which distributes the control resources in a first region of the control channel region and places the null resources adjacent to the distributed control resources in a second region of the control channel region; and
    a mapper which maps the control resources and null resources to the control channel region,
    wherein the null resources are not used for transmitting the control channel.

7. The apparatus of claim 6, wherein the resource arrangement unit comprises:
    a deinterleaver which performs deinterleaving to change at least one the control and null resources in position; and
    an interleaver which performs interleaving to arrange the control resources and the null resources.

8. The apparatus of claim 6, further comprising a controller which assigns at least some of the null resources to other receivers.

9. The apparatus of claim 8, wherein the receiver is a relay, and the other receivers are user terminals.

10. The apparatus of claim 6, wherein the control channel region is formed according to an orthogonal frequency division multiplexing scheme, and the control resources are formed in units of one of two, four, eight, and sixteen resource elements and mapped in the control channel region in one of time domain-preferred order and frequency domain-preferred order.

11. A method for receiving a control channel, comprising:
    arranging channel resources in a predetermined control channel region;
    sorting the channel resources into control resources in a first region of the control channel region for control signals and null resources adjacent to the control resources in a second region of the control channel region; and
    receiving the control signal in at least some of the control resources,
    wherein the null resources are not used for receiving the control channel.

12. The method of claim 11, wherein the control channel region is formed according to an orthogonal frequency division multiplexing scheme, and the control resources are formed in units of one of two, four, eight, and sixteen resource elements and mapped in the control channel region in one of time domain-preferred order and frequency domain-preferred order.

13. An apparatus for receiving a control channel, comprising:
    a demapper which arranges channel resources in a predetermined control channel region;
    a resource arrangement unit which sorts the channel resources into control resources in a first region of the control channel region for control signals and null resources adjacent to the control resources in a second region of the control channel region; and
    a decoder which decodes the control signal in at least some of the control resources, wherein the null resources are not used for receiving the control channel.

14. The apparatus of claim 13, wherein the control channel region is formed according to an orthogonal frequency division multiplexing scheme, and the control resources are formed in units of one of two, four, eight, and sixteen resource elements and mapped in the control channel region in one of time domain-preferred order and frequency domain-preferred order.

15. The apparatus of claim 13, wherein the apparatus is a relay.

* * * * *